(12) United States Patent
Himukashi

(10) Patent No.: US 11,985,298 B2
(45) Date of Patent: May 14, 2024

(54) IMAGE ADJUSTMENT SYSTEM, IMAGE ADJUSTOR, AND IMAGE ADJUSTMENT METHOD

(71) Applicant: JVCKENWOOD Corporation, Yokohama (JP)

(72) Inventor: Takashi Himukashi, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 375 days.

(21) Appl. No.: 17/361,767

(22) Filed: Jun. 29, 2021

(65) Prior Publication Data
US 2021/0329223 A1    Oct. 21, 2021

Related U.S. Application Data

(63) Continuation of application No. PCT/JP2020/004700, filed on Feb. 7, 2020.

(30) Foreign Application Priority Data

Feb. 15, 2019  (JP) .................................. 2019-025762
Feb. 15, 2019  (JP) .................................. 2019-025763
(Continued)

(51) Int. Cl.
*H04N 13/398* (2018.01)
*G06F 3/01* (2006.01)
(Continued)

(52) U.S. Cl.
CPC ........... *H04N 13/398* (2018.05); *G06F 3/014* (2013.01); *G06T 3/60* (2013.01); *G06T 7/30* (2017.01);
(Continued)

(58) Field of Classification Search
CPC .... H04N 13/398; H04N 13/344; H04N 23/90; H04N 23/698; G06T 7/30; G06T 3/60; G06T 15/205; G06T 19/006; G06F 3/014
See application file for complete search history.

(56) References Cited

U.S. PATENT DOCUMENTS

| | | |
|---|---|---|
| 2007/0206030 A1 | 9/2007 | Lukis |
| 2019/0005609 A1* | 1/2019 | Kato ..................... G06T 3/4038 |
| 2020/0037043 A1* | 1/2020 | Phillips ............ H04N 21/23418 |

FOREIGN PATENT DOCUMENTS

| | | | |
|---|---|---|---|
| JP | 2005-56295 A | 3/2005 | |
| JP | 2005-319136 A | 11/2005 | |

(Continued)

*Primary Examiner* — Mishawn N. Hunter
(74) *Attorney, Agent, or Firm* — Nath, Goldberg & Meyer; Jerald L. Meyer

(57) ABSTRACT

An image adjustment system includes a camera, an image adjustor, an image display, and a controller. The image adjustor includes an image generator and an image processor. The image generator generates a spherical image and a composite image to be synthesized with a shooting image imaged by the camera. The image processor acquires the spherical image generated by the image generator and displays the spherical image on an image display. The image processor rotates the spherical image based on instruction information output from the controller, adjusts the shooting image displayed on the image display in accordance with rotating the spherical image, adjusts the composite image in accordance with the adjusted shooting image, and synthesizes the adjusted composite image with the adjusted shooting image.

10 Claims, 17 Drawing Sheets

(30) Foreign Application Priority Data

Feb. 15, 2019 (JP) ................................. 2019-025765
Feb. 15, 2019 (JP) ................................. 2019-025769

(51) Int. Cl.
*G06T 3/60* (2006.01)
*G06T 7/30* (2017.01)
*G06T 15/20* (2011.01)
*G06T 19/00* (2011.01)
*H04N 13/344* (2018.01)
*H04N 23/698* (2023.01)
*H04N 23/90* (2023.01)

(52) U.S. Cl.
CPC .......... *G06T 15/205* (2013.01); *G06T 19/006* (2013.01); *H04N 13/344* (2018.05); *H04N 23/698* (2023.01); *H04N 23/90* (2023.01)

(56) References Cited

FOREIGN PATENT DOCUMENTS

| | | |
|---|---|---|
| JP | 2007-116538 A | 5/2007 |
| JP | 2013-16020 A | 1/2013 |

\* cited by examiner

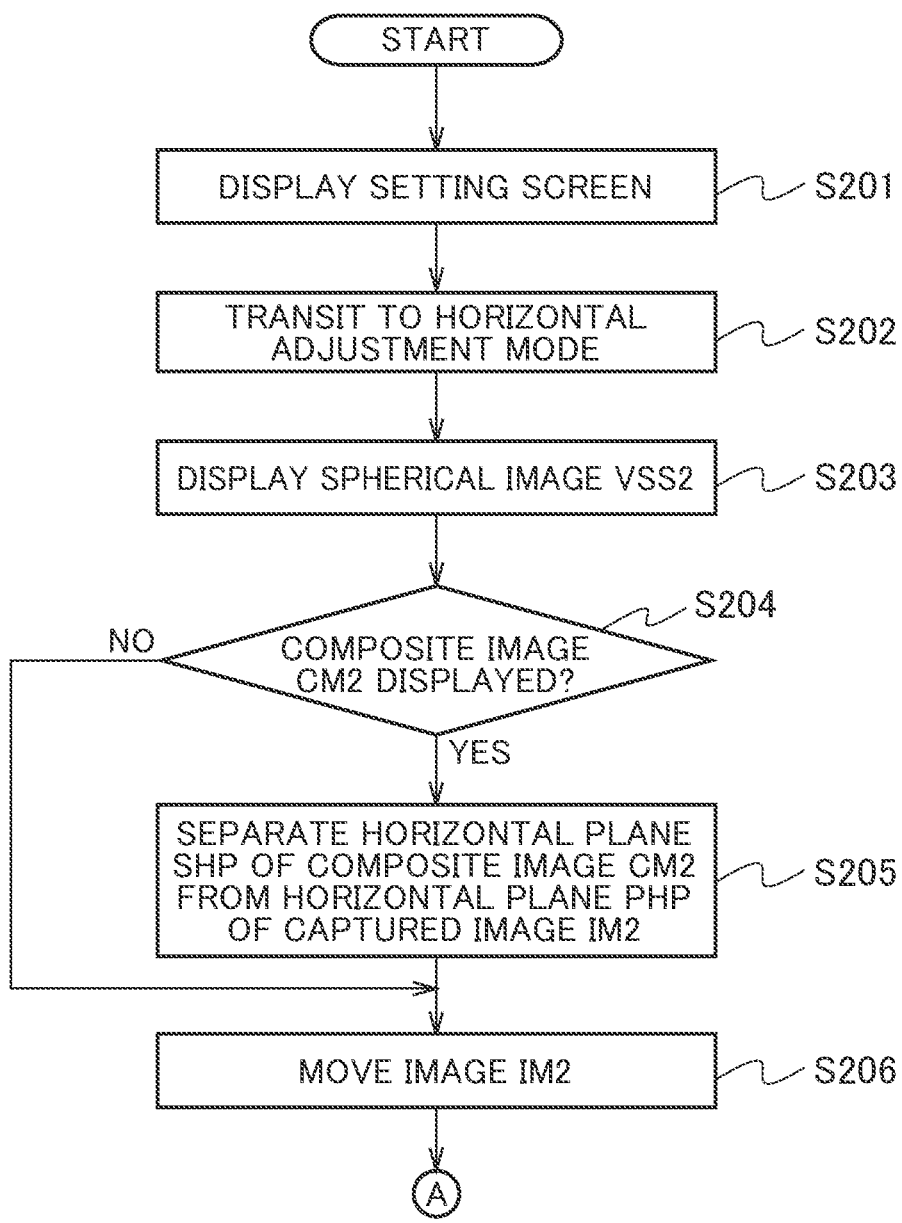

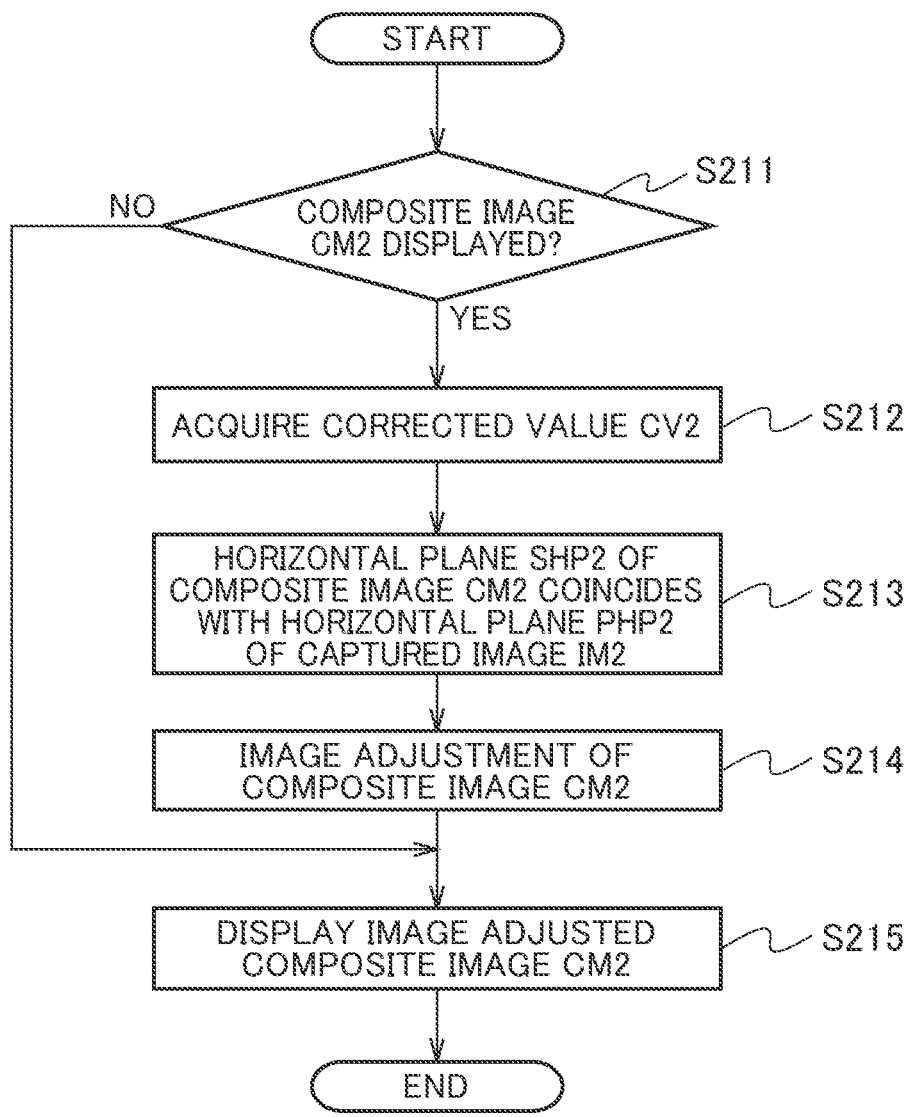

IMAGE ADJUSTMENT SYSTEM, IMAGE ADJUSTOR, AND IMAGE ADJUSTMENT METHOD

CROSS-REFERENCE TO RELATED APPLICATIONS

The present application is a continuation of International Application No. PCT/JP2020/004700, filed on Feb. 7, 2020, and based upon and claims the benefit of priority from Japanese Patent Applications No. 2019-025762, No. 2019-025763, No. 2019-025765, and No. 2019-025769 filed on Feb. 15, 2019, the entire contents of which are incorporated herein by reference.

TECHNICAL FIELD

The present disclosure relates to an image adjustment system, an image adjustor, and an image adjustment method.

BACKGROUND

Recently, a head-mounted display has attracted attention as an image display. The head-mounted display displays an image in a state of mounted on a head of a user, so that the user can obtain a sense of entering a virtual space (immersion). A conventional head mount display described in Patent Document 1 (JP 2005-056295A) can display an image imaged by an external camera through a neck work.

SUMMARY

However, in the conventional head-mounted display, it may be difficult to detect the horizontal direction of an image depending on the displayed image, and the horizontal direction may be erroneously detected. In addition, the horizontal or zenith designation may be shifted due to problems such as system synchronization. If the horizontal direction of the image is incorrectly detected or the horizontal or zenith designation is deviated, the user feels uncomfortable because the displayed image does not match the user's sense of gravity.

An object of the present application is to provide an image adjustment system, an image adjustor, and an image adjustment method, capable of easily correcting the horizontal or zenith of an image when the horizontal direction of the image is erroneously detected or the horizontal or zenith designation is deviated.

An image adjustment system according to an embodiment includes: a camera; an image adjustor configured to adjust a shooting image imaged by the camera; an image display configured to display the shooting image adjusted by the image adjustor; and a controller configured to output instruction information to the image adjustor. The image adjustor includes an image generator configured to generate a spherical image and a composite image to be synthesized with the shooting image, and an image processor configured to acquire the spherical image generated by the image generator based on the instruction information and display the spherical image on the image display, rotate the spherical image based on the instruction information, adjust the shooting image displayed on the image display in accordance with rotating the spherical image, adjust the composite image in accordance with the adjusted shooting image, and synthesize the adjusted composite image with the adjusted shooting image. The camera is an omnidirectional camera configured to image a range of 360 degrees. The image display is a head-mounted display capable of mounting on a head of a user. The controller is a glove type controller capable of attaching on a hand of the user. When the user watches the spherical image displayed on the image display in a state where the image display is mounted on the head of the user, the spherical image is a virtual image arranged around the user and the image display and set to display within a range where the hand or a finger of the user is reached to the spherical image.

With the image adjustment system according to the embodiment, when the horizontal direction of the image is erroneously detected or the horizontal or zenith designation is deviated, the horizontal or zenith of the image can be easily corrected.

BRIEF DESCRIPTION OF THE DRAWINGS

FIG. 6A is a flowchart illustrating an example of an image adjustment method according to a second embodiment.

FIG. 7 is a flowchart illustrating an example of the image adjustment method according to the second embodiment.

DETAILED DESCRIPTION

First Embodiment

Figure 1:
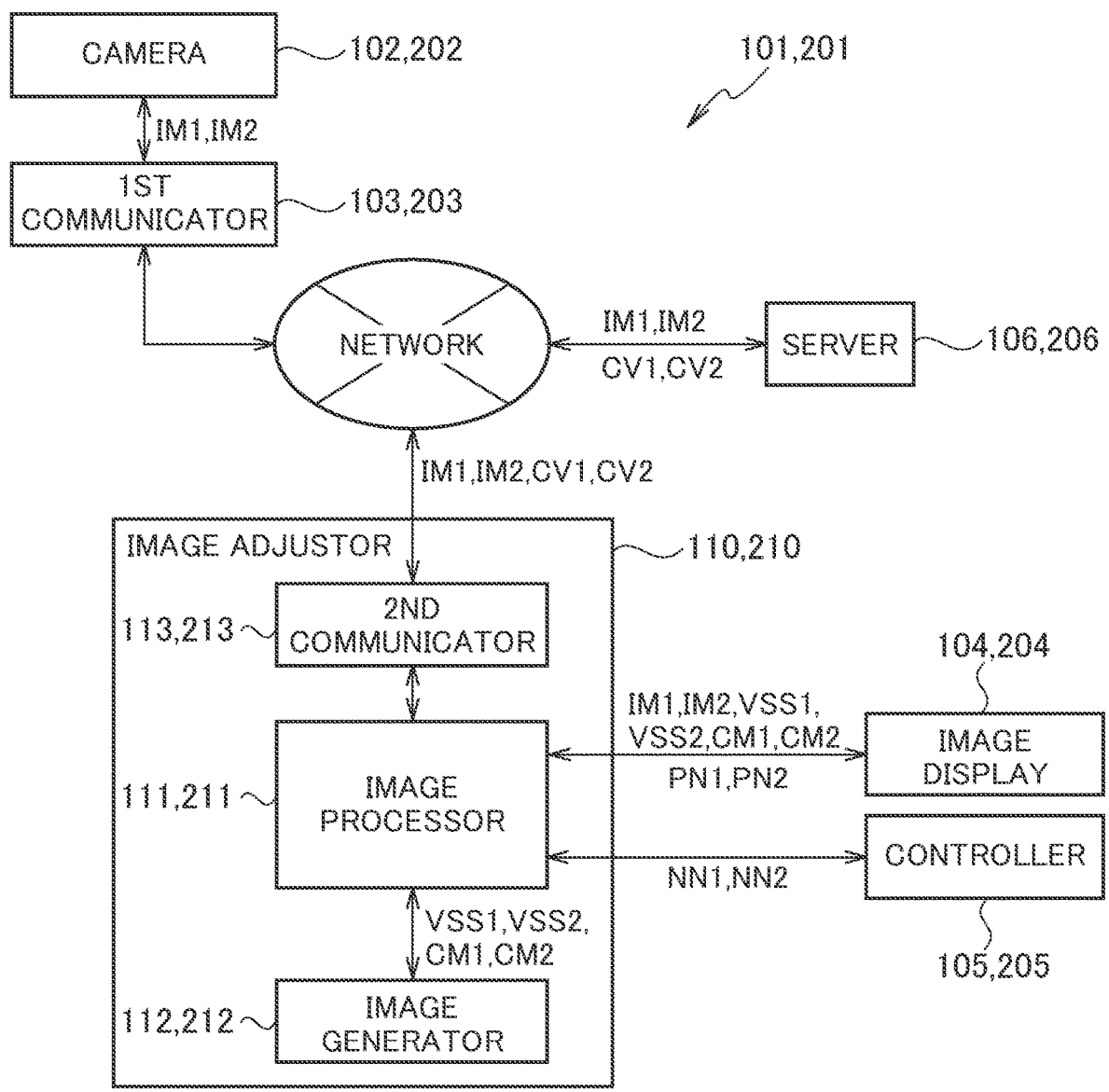
FIG. 1 is a block diagram illustrating an image adjustment system according to a first and second embodiments.

With reference to FIG. 1, a configuration example of an image adjustment system 101 according to a first embodiment will be described. The image adjustment system 101 according to the first embodiment includes a camera 102, a first communicator 103, an image display 104, a controller 105, an image adjustor 110, and a server 106. The image adjustor 110 includes an image processor 111, an image generator 112, and a second communicator 113.

The camera 102 is an omnidirectional camera (360 degree camera) capable of imaging a range of 360 degrees. The first communicator 103 and the second communicator 113 are connected through a network. The image adjustor 110 can acquire a shooting image IM1 imaged by the camera 102 through the first communicator 103, the second communicator 113, and the network.

Computer equipment may be used as the image adjustor 110. A CPU may be used as the image processor 111 and the image generator 112. The image generator 112 and the second communicator 113 may be provided outside the image adjustor 110.

The server 106 is connected through the network and the first communicator 103 to the camera 102, and connected through the network and the second communicator 113 to the image adjustor 110. The server 106 may acquire the shooting image IM1 imaged by the camera 102 via the first communicator 103 and the network, and the image adjustor 110 may acquire the shooting image IM1 from the server 106 via the network and the second communicator 113.

The shooting image IM1 acquired by the image adjustor 110 is input to the image processor 111. The image processor 111 analyzes the shooting image IM1 to recognize the horizontal direction of the shooting image IM1. The image processor 111 may recognize the vertical direction of the shooting image IM1 or may recognize the horizontal and vertical directions of the shooting image IM1 by analyzing the shooting image IM1. The image adjustor 110 corrects distortion of the shooting image IM1, executes image processing such as adjustment of the horizontal position of the shooting image IM1, and outputs the image-processed shooting image IM1 to the image display 104.

The server 106 may correct distortion of the shooting image IM1 imaged by the camera 102, execute image processing such as adjusting the horizontal position of the shooting image IM1, and output the image-processed shooting image IM1 to the image adjustor 110. The image display 104 displays the shooting image IM1 subjected to image processing by the image adjustor 110 or the server 106.

The image display 104 is, for example, a head-mounted display. The controller 105 is, for example, a glove type controller used for VR (Virtual Reality) or the like.

Figure 2:
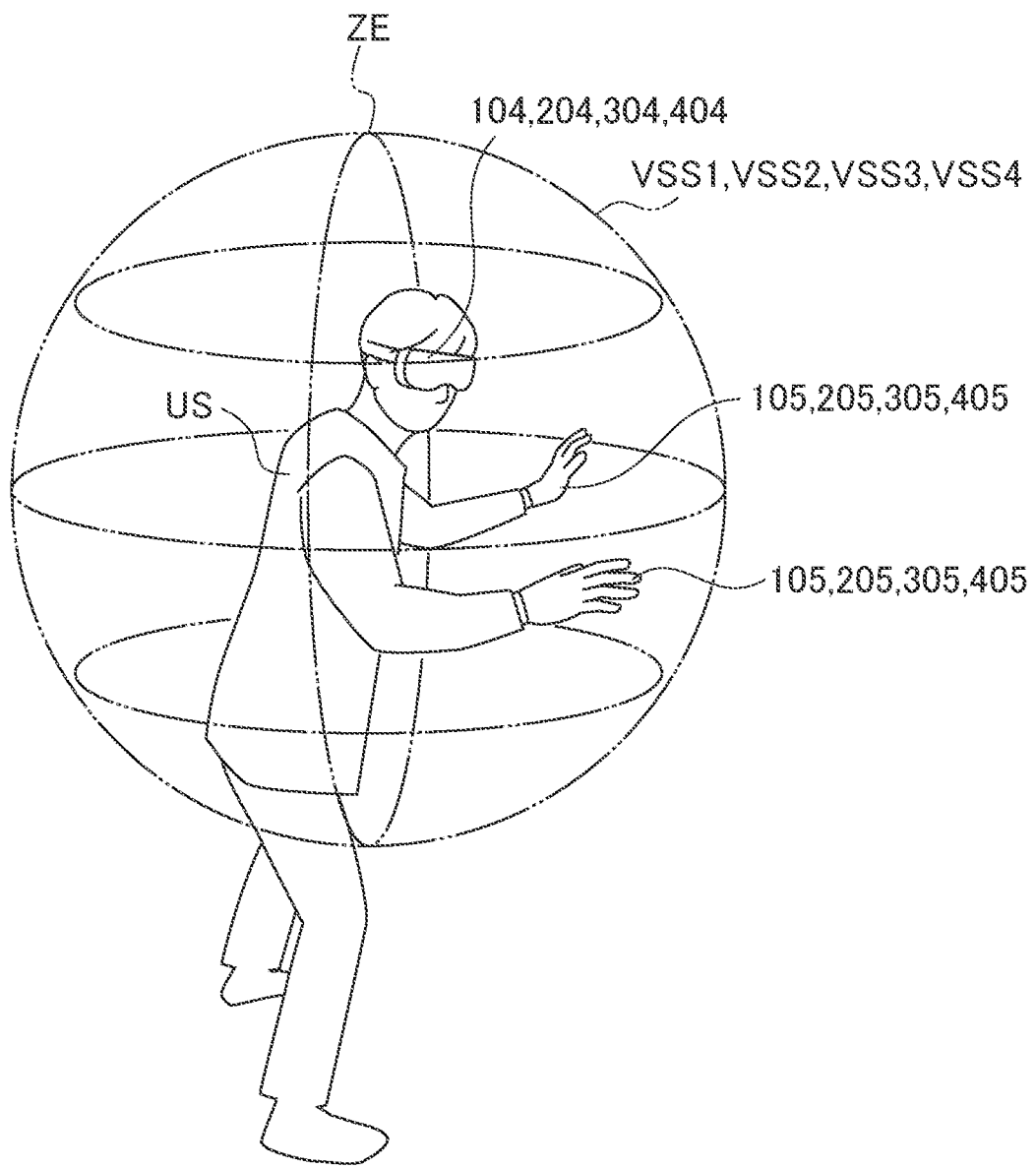
FIG. 2 illustrates a relationship between a spherical image and a user.

FIG. 2 schematically illustrates a state in which the image display 104 is mounted on the head of the user US and the controller 105 is mounted on the hands of the user US. The symbol ZE in FIG. 2 indicates the zenith. It is desirable that the zenith of the camera 102 coincides with the zenith of the user US. By attaching the image display 104 to the head of the user US, the user US can watch the shooting image IM1 subjected to image processing by the image adjustor 110 or the server 106.

The image display 104 generates attitude information PN1 on the basis of a direction in which the user US faces and a state such as the attitude of the user US in a state of being mounted on the head of the user US. The image processor 111 acquires attitude information PN1 from the image display 104. That is, the image processor 111 acquires the attitude information PN1 based on the attitude of the image display 104. The image processor 111 displays on the image display 104, on the basis of the attitude information PN1, an image of an area corresponding to the direction in which the user US faces and the state of the attitude of the user US from the shooting image IM1 imaged by the camera 102.

The controller 105 generates instruction information NN1 based on a state such as the movement or attitude of the hand of the user US or the movement or attitude of the finger of the user US in a state of being mounted on the hand of the user US. Hereinafter, the hand or finger is simply abbreviated as the hand. An image processor 111 acquires the instruction information NN1 from a controller 105. The image processor 111 can change or adjust the shooting image IM1 displayed on the image display 104 based on the instruction information NN1.

An image generator 112 generates a composite image CM1 which is a CG (Computer Graphics) to be synthesized with the shooting image IM1. The composite image CM1 is an image of a character such as an avatar. The image generator 112 stores the composite image CM1 in a built-in memory or an external memory. The image processor 111 may acquire the composite image CM1 generated by the image generator 112 and output it to the server 106 via the second communicator 113 and the network.

The server 106 stores the composite image CM1 in a built-in memory or an external memory in association with the image display 104 or the user US. The image processor 111 acquires a composite image CM1 from the image generator 112 or the server 106 on the basis of instruction information NN1, and synthesizes the composite image CM1 with a shooting image IM1 displayed on the image display 104. Therefore, the image display 104 can display the shooting image IM1 imaged by the camera 102 and the composite image CM1 acquired from the image generator 112 or the server 106 and synthesized with the shooting image IM1.

The image generator 112 generates a spherical image VSS1 which is a virtual image constituted of a spherical surface which is CG. The image generator 112 stores the spherical image VSS1 in a built-in memory or an external memory. On the basis of the instruction information NN1, the image processor 111 acquires the spherical image VSS1 generated by the image generator 112 and displays the spherical image VSS1 on the image display 104.

FIG. 2 schematically illustrates an image of the user US when the user US watches the spherical image VSS1 displayed on the image display 104 while the image display 104 is mounted on the head of the user US.

While the image display 104 is mounted on the head of the user US, when the user US watches the spherical image VSS1 displayed on the image display 104, the spherical image VSS1 is arranged around the user US and the image display 104 and is set to display within a range where the hand of the user US is reached to the spherical image VSS1. The user US feels that the hand of the user US is in contact with the spherical image VSS1 by moving the hand on which the controller 105 is mounted to a position corresponding to the spherical image VSS1 displayed on the image display 104.

The controller 105 may have an actuator placed in contact with the hand of the user US. On the basis of the instruction information NN1, the image processor 111 operates the actuator when it is determined that the hand of the user US has moved to a position corresponding to the spherical image VSS1. When the actuator applies pressure to the hand of the user US, the user US can actually feel the feeling that the hand is in contact with the spherical image VSS1.

In a state where the spherical image VSS1 is displayed on the image display 104, when the user US moves the hand on which the controller 105 is mounted in an arbitrary direction, the image processor 111 performs image processing based on the instruction information NN1 so that the spherical image VSS1 and the shooting image IM1 displayed on the image display 104 move in accordance with the moving direction, the moving speed, and the position of the movement destination of the hand of the user US.

The user US can rotate the spherical image VSS1 in any direction to any position at any speed by moving the hand in any direction to any position at any speed. That is, the user US can rotate the spherical image VSS1 by the movement of the hand. The image processor 111 moves the shooting image IM1 corresponding to the rotation of the spherical image VSS1.

The image processor 111 can determine to which position on the coordinate of the spherical image VSS1 the zenith ZE of the user US before the user US rotates the spherical image VSS1 has moved by the user US rotating the spherical image VSS1. An image processor 111 calculates a change amount of the spherical image VSS1 before and after the user US rotates the spherical image VSS1 based on the moving direction of the zenith ZE and the position of the moving destination on the coordinate of the spherical image VSS1.

The amount of change of the spherical image VSS1 corresponds to the amount of rotation (rotation angle) of the spherical image VSS1 obtained by synthesizing the amount of rotation (rotation angle) about the X axis, the amount of rotation (rotation angle) about the Y axis, and the amount of rotation (rotation angle) about the Z axis in the spherical image VSS1. The image processor 111 stores the variation of the spherical image VSS1 as a correction value CV1. That is, the correction value CV1 is calculated based on the rotation direction of the spherical image VSS1 and the moving amount or moving angle of the zenith ZE (rotation angle of the spherical image VSS1).

The image processor 111 may store the coordinates on the spherical image VSS1 of the zenith ZE as the correction value CV1 after the user US rotates the spherical image VSS1. The image processor 111 may store the correction value CV1 in a built-in memory or an external memory, or may output the correction value CV1 to the server 106 via the second communicator 113 and the network. The server 106 stores the correction value CV1 in a built-in memory or an external memory in association with the image display 104 or the user US.

The image processor 111 detects the horizontal direction of the shooting image IM1. However, it is difficult for the image processor 111 to detect the horizontal direction depending on the shooting image IM1, and the horizontal direction may be erroneously detected. In addition, the horizontal or zenith designation may be shifted due to problems such as system synchronization. When the horizontal direction of the shooting image IM1 is erroneously detected or when the horizontal or zenith designation is deviated, the user US feels a sense of incongruity because the shooting image IM1 displayed on the image display 104 does not coincide with the gravity sensation of the user US.

An example of an image adjustment method according to the first embodiment will be described with reference to flowcharts illustrated in FIGS. 3 and 4. Specifically, an example of a method for adjusting the horizontal position of the shooting image IM1 and the composite image CM1 will be described. The image display 104 is mounted on the head of the user US, and the controller 105 is attached to the hand of the user US. The image display 104 displays the shooting image IM1 and the composite image CM1. At this point, the composite image CM1 may not be displayed.

Figure 3:
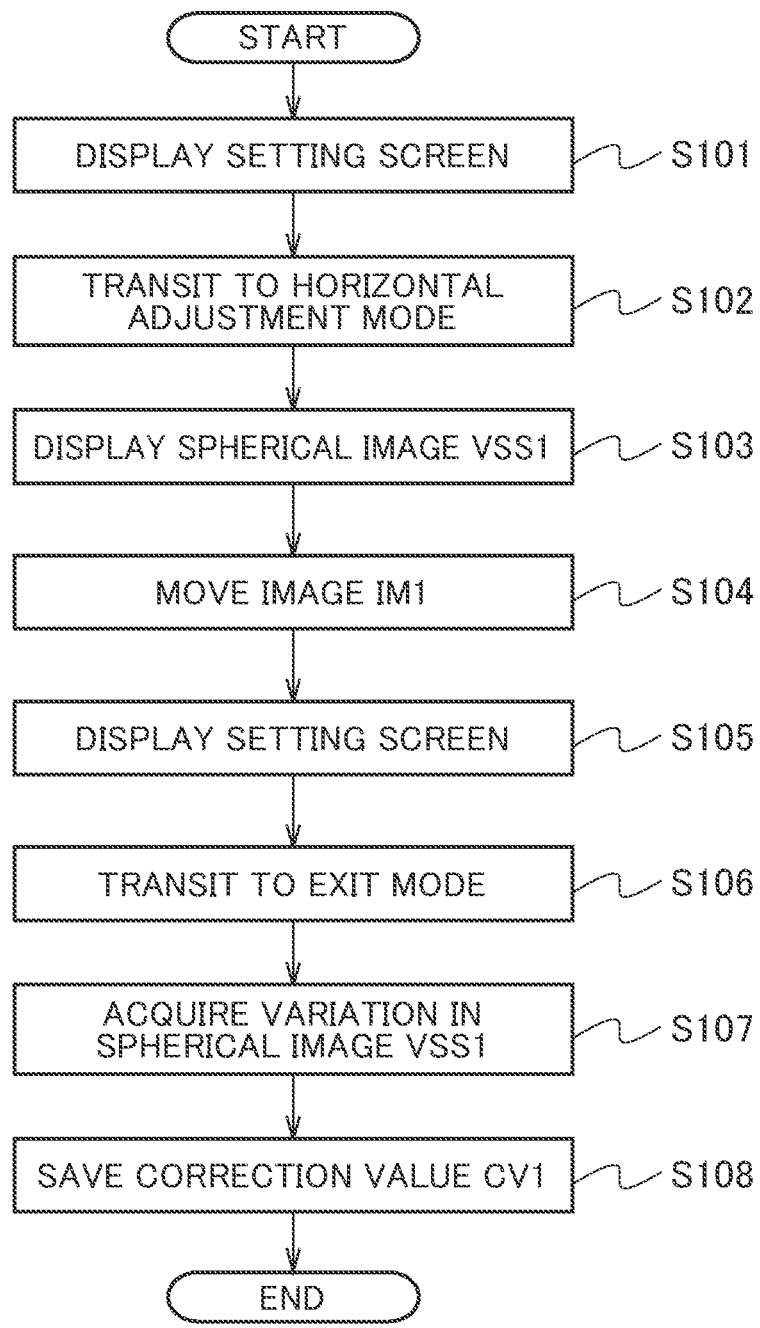
FIG. 3 is a flowchart illustrating an example of an image adjustment method according to the first embodiment.

If the user US determines that the shooting image IM1 displayed on the image display 104 is not horizontal, in FIG. 3, the user US operates the controller 105 so that the image processor 111 causes the image display 104 to display a setting screen in step S101.

When the user US operates the controller 105 to select a predetermined item (e.g. horizontal adjustment items) displayed on the setting screen, the image processor 111 shifts the processing to a predetermined processing mode corresponding to the selected item in step S102. When the item of horizontal adjustment is selected, the image processor 111 shifts the processing to a processing mode (horizontal adjustment mode) for adjusting the horizontal of the shooting image IM1.

In step S103, the image processor 111 acquires the spherical image VSS1 generated by the image generator 112, and displays the spherical image VSS1 on the image display 104. In the image display 104, the shooting image IM1, the spherical image VSS1, and the composite image CM1 are mixed and displayed. When the user US rotates the spherical image VSS1 so that the shooting image IM1 becomes horizontal, the image processor 111 moves the shooting image IM1 displayed on the image display 104 in step S104 in accordance with the rotation of the spherical image VSS1. The user US may rotate the spherical image VSS1 a plurality of times until the shooting image IM1 becomes horizontal.

When the user US determines that the shooting image IM1 is horizontal, the controller 105 is operated so that the image processor 111 terminates the display of the spherical image VSS1 in step S105 and causes the image display 104 to display a setting screen. By making the shooting image IM1 displayed on the image display 104 horizontal, the zenith of the camera 102 and the zenith of the user US can be matched.

When the user US operates the controller 105 to select a predetermined item (e.g. end item) displayed on the setting screen, the image processor 111 shifts the processing to a predetermined processing mode corresponding to the selected item in step S106. When the item to be ended is selected, the image processor 111 shifts the processing to a processing mode (exit mode) for ending the horizontal adjustment.

In step S107, the image processor 111 acquires the amount of rotation (rotation angle) before and after the rotation of the spherical image VSS1 as the amount of change of the spherical image VSS1. In step S108, the image processor 111 stores the amount of change in the spherical image VSS1 as the correction value CV1, and ends the process.

If the composite image CM1 is not displayed in steps S101 to S108 of FIG. 3, by the user US operating the controller 105, the image adjustor 110 (more specifically, the image processor 111) can acquire the composite image CM1 generated by the image generator 112, synthesize the composite image CM1 with the shooting image IM1 displayed on the image display 104, and display the synthesized image.

Figure 5:
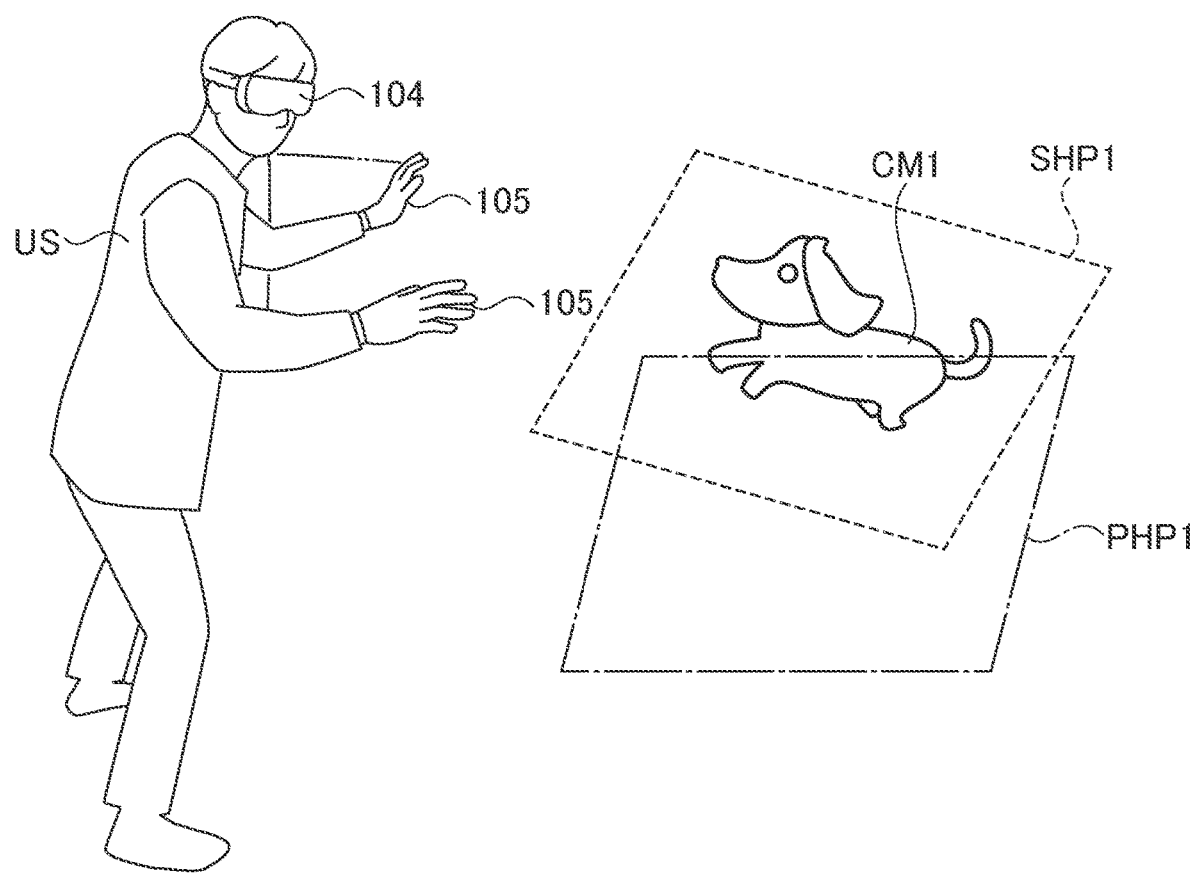
FIG. 5 is a view illustrating a relationship between a horizontal plane of a shooting image and a horizontal plane of a composite image.

FIG. 5 schematically illustrates the relationship between the horizontal plane PHP1 of the shooting image IM1 horizontally adjusted by the user US and the horizontal plane SHP1 of the composite image CM1 acquired by the image processor 111 from the image generator 112. When the horizontal plane PHP1 of the shooting image IM1 deviates from the horizontal plane SHP1 of the composite image CM1, the user US feels a sense of incongruity.

Figure 4:
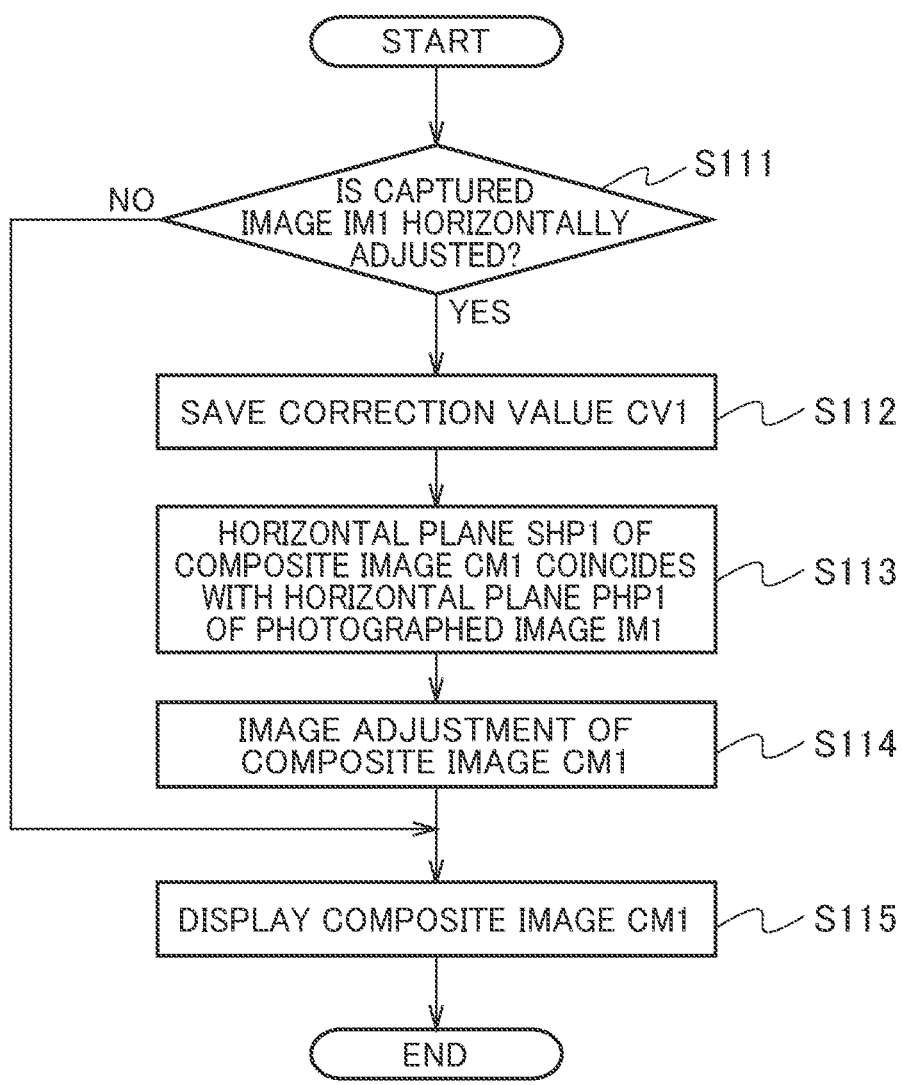
FIG. 4 is a flowchart illustrating an example of the image adjustment method according to the first embodiment.

In FIG. 4, the image processor 111 determines in step S111 whether or not the shooting image IM1 has been horizontally adjusted. The image processor 111 can determine whether or not the shooting image IM1 has been horizontally adjusted based on the history of the rotation of the spherical image VSS1, the correction value CV1, or the like.

If it is determined in step S111 that the shooting image IM has been horizontally adjusted (YES), the image processor 111 acquires the stored correction value CV1 in step S112. In step S113, the image processor 111 rotates the coordinate axis of the composite image CM1 based on the correction value CV1, and makes the horizontal plane SHP1 of the composite image CM1 coincide with the horizontal plane PHP1 of the shooting image IM1. In step S114, the image processor 111 performs arithmetic processing on the composite image CM1 based on the corrected horizontal plane SHP1 to adjust the image.

In step S115, the image processor 111 synthesizes the adjusted composite image CM1 with the shooting image IM1 and displays the synthesized image on the image display 104. If it is determined in step S111 that the shooting image IM1 is not horizontally adjusted (NO), the image processor 111 shifts the processing to step S115.

In the image adjustment system 101, the image adjustor 110, and the image adjustment method according to the first embodiment, the image display 104 displays the spherical image VSS1. With the image adjustment system 101, the image adjustor 110, and the image adjustment method according to the first embodiment, when the horizontal direction of the shooting image IM1 is erroneously detected or when the horizontal direction or the zenith ZE designation is deviated, the user US operates the controller 105 to rotate the spherical image VSS1, so that the shooting image IM1 displayed on the image display 104 can be adjusted to be horizontal.

Therefore, with the image adjustment system 101, the image adjustor 110, and the image adjustment method according to the first embodiment, when the horizontal direction of the shooting image IM1 is erroneously detected or the horizontal or zenith designation is shifted, the user US can easily correct the horizontal or zenith of the shooting image IM1.

With the image adjustment system 101, the image adjustor 110, and the image adjustment method according to the first embodiment, when the correction value CV1 is stored, the image processor 111 reads the correction value CV1, adjusts the shooting image IM1 imaged by the camera 102 based on the correction value CV1, and displays the image on the image display 104.

In the image adjustment system 101, the image adjustor 110, and the image adjustment method according to the first embodiment, when the shooting image IM1 is horizontally adjusted, the coordinate axis of the composite image CM1 is rotated based on the correction value CV1, and the horizontal plane SHP1 of the composite image CM1 is made to coincide with the horizontal plane PHP1 of the shooting image IM1. With the image adjustment system 101, the image adjustor 110, and the image adjustment method according to the first embodiment, the shooting image IM1 and the composite image CM1 can be displayed on the image display 104 without causing a sense of incongruity to the user US.

Second Embodiment

With reference to FIG. 1, a configuration example of an image adjustment system 201 according to a second embodiment will be described. The image adjustment system 201 according to the second embodiment includes a camera 202, a first communicator 203, an image display 204, a controller 205, an image adjustor 210, and a server 206. The image adjustor 210 includes an image processor 211, an image generator 212, and a second communicator 213.

The camera 202, the first communicator 203, the image display 204, the controller 205, the image adjustor 210, and the server 206 of the second embodiment correspond to the camera 102, the first communicator 103, the image display 104, the controller 105, the image adjustor 110, and the server 106 of the first embodiment. The image processor 211, the image generator 212, and the second communicator 213 of the second embodiment correspond to the image processor 111, the image generator 112, and the second communicator 113 of the first embodiment.

The image adjustor 210 can acquire a shooting image IM2 imaged by the camera 202 through the first communicator 203, the second communicator 213, and a network. The server 206 may acquire a shooting image IM2 imaged by the camera 202 via the first communicator 203 and the network, and the image adjustor 210 may acquire the shooting image IM2 from the server 206 via the network and the second communicator 213.

The shooting image IM2 acquired by the image adjustor 210 is input to the image processor 211. The image processor 211 analyzes the shooting image IM2 to recognize the horizontal direction of the shooting image IM2. The image processor 211 may analyze the shooting image IM2 to recognize the vertical direction in the shooting image IM2, or may recognize the horizontal direction and the vertical direction. The image adjustor 210 corrects distortion of the shooting image IM2, executes image processing such as adjustment of the horizontal position of the shooting image IM2, and outputs the image-processed shooting image IM2 to the image display 204.

The server 206 may correct distortion of the shooting image IM2 imaged by the camera 202, perform image processing such as adjusting the horizontal position of the shooting image IM2, and output the image-processed shooting image IM2 to the image adjustor 210. The image display 204 displays the shooting image IM2 subjected to image processing by the image adjustor 210 or the server 206. By attaching the image display 204 to the head of the user US, the user US can watch the shooting image IM2 subjected to image processing by the image adjustor 210 or the server 206.

The image display 204 generates attitude information PN2 on the basis of a direction in which the user US faces and a state such as the attitude of the user US in a state of being mounted on the head of the user US. The image processor 211 acquires the attitude information PN2 from an image display 204. That is, the image processor 211 acquires the attitude information PN2 based on the attitude of the image display 204. The image processor 211 displays, on the basis of the attitude information PN2, an image of an area corresponding to the direction in which the user US faces and the attitude of the user US from the shooting image IM2 imaged by the camera 202 on the image display 204.

The controller 205 generates instruction information NN2 on the basis of the state such as the movement or attitude of the hand of the user US in the state of being attached on the hand of the user US. The image processor 211 acquires the instruction information NN2 from the controller 205. Based on the instruction information NN2, the image processor 211 can change or adjust the shooting image IM2 displayed on the image display 204.

The image generator 212 generates a composite image CM2 being CG to be synthesized with the shooting image IM2. The composite image CM2 is an image of a character such as an avatar. The image generator 212 stores the composite image CM2 in a built-in memory or an external memory. The image processor 211 may acquire the composite image CM2 generated by the image generator 212 and output it to the server 206 via the second communicator 213 and the network. The server 206 stores the composite image CM2 in a built-in memory or an external memory in association with the image display 204 or the user US.

The image processor 211 acquires the composite image CM2 from the image generator 212 or the server 206 based on the instruction information NN2, and synthesizes the composite image CM2 with the shooting image IM2 displayed on the image display 204. Therefore, the image display 204 can display the shooting image IM2 imaged by the camera 202 and the composite image CM2 acquired from the image generator 212 or the server 206 and synthesized with the shooting image IM2.

The image generator 212 generates a spherical image VSS2 which is a virtual image constituted of a spherical surface which is CG. The image generator 212 stores the spherical image VSS2 in a built-in memory or an external memory. On the basis of the instruction information NN2, the image processor 211 acquires the spherical image VSS2 generated by the image generator 212 and displays the spherical image VSS2 on the image display 204.

The spherical image VSS2 of the second embodiment corresponds to the spherical image VSS1 of the first embodiment. By moving the hand on which the controller 205 is attached to a position corresponding to the spherical image VSS2 displayed on the image display 204, the user US feels as if the hand of the user US is in contact with the spherical image VSS2.

The controller 205 may have an actuator placed in contact with the hand of the user US. On the basis of the instruction information NN2, the image processor 211 operates the actuator when it is determined that the hand of the user US has moved to a position corresponding to the spherical image VSS2. When the actuator applies pressure to the hand of the user US, the user US can actually feel the feeling that the hand is in contact with the spherical image VSS2.

In a state where the spherical image VSS2 is displayed on the image display 204, when the user US moves the hand on which the controller 205 is attached in an arbitrary direction, the image processor 211 performs image processing based on the instruction information NN2 so that the spherical image VSS2 and the shooting image IM2 displayed on the image display 204 move in accordance with the moving direction of the hand, the moving speed, and the position of the movement destination of the user US.

The user US can rotate the spherical image VSS2 in any direction to any position at any speed by moving the hand in any direction to any position at any speed. That is, the user US can rotate the spherical image VSS2 by the movement of the hand. The image processor 211 moves the shooting image IM2 corresponding to the rotation of the spherical image VSS2.

The image processor 211 can determine to which position on the coordinate of the spherical image VSS2 the zenith ZE of the user US before the user US rotates the spherical image VSS2 has moved by the user US rotating the spherical image VSS2. The image processor 211 calculates a change amount of the spherical image VSS2 before and after the user US rotates the spherical image VSS2 based on the moving direction of the zenith ZE and the position of the moving destination on the coordinate of the spherical image VSS2. The variation of the spherical image VSS2 of the second embodiment corresponds to the variation of the spherical image VSS1 of the first embodiment.

The image processor 211 stores the amount of change in the spherical image VSS2 as a correction value CV2. The correction value CV2 of the second embodiment corresponds to the correction value CV1 of the first embodiment. The image processor 211 may store the coordinates on the spherical image VSS2 of the zenith ZE after the user US rotates the spherical image VSS2 as the correction value CV2. The image processor 211 may store the correction value CV2 in a built-in memory or an external memory, or may output the correction value CV2 to the server 206 via the second communicator 213 and the network. The server 206 stores the correction value CV2 in a built-in memory or an external memory in association with the image display 204 or the user US.

The image processor 211 detects the horizontal direction of the shooting image IM2. However, it is difficult for the image processor 211 to detect the horizontal direction depending on the shooting image IM2, and the horizontal direction may be erroneously detected. In addition, the horizontal or zenith designation may be shifted due to problems such as system synchronization. When the horizontal direction of the shooting image IM2 is erroneously detected or when the horizontal or zenith designation is deviated, the user US feels a sense of incongruity because the shooting image IM2 displayed on the image display 204 does not coincide with the gravity sensation of the user US.

An example of an image adjustment method according to the second embodiment will be described with reference to flowcharts illustrated in FIGS. 6A, 6B, and 7. Specifically, an example of a method for adjusting the horizontal position of the shooting image IM2 and the composite image CM2 will be described. The image display 204 is mounted on the head of the user US, and the controller 205 is mounted on the hand of the user US. The image display 204 displays the shooting image IM2 and the composite image CM2. The composite image CM2 may not be displayed.

If the user US determines that the shooting image IM2 displayed on the image display 204 is not horizontal, in FIG. 6A, the user US operates the controller 205 so that the image processor 211 causes the image display 204 to display a setting screen in step S201.

When the user US operates the controller 205 to select a predetermined item (e.g. horizontal adjustment item) displayed on the setting screen, the image processor 211 shifts the processing to a predetermined processing mode corresponding to the selected item in step S202. When the item of horizontal adjustment is selected, the image processor 211 shifts the processing to a processing mode (horizontal adjustment mode) for adjusting the horizontal of the shooting image IM2.

In step S203, the image processor 211 acquires the spherical image VSS2 generated by the image generator 212, and displays the spherical image VSS2 on the image display 204. In the image display 204, the shooting image IM2 and the spherical image VSS2 are mixed and displayed. In step S204, the image processor 211 determines whether or not the composite image CM2 is synthesized with the shooting image IM2 and displayed on the image display 204.

Figure 8:
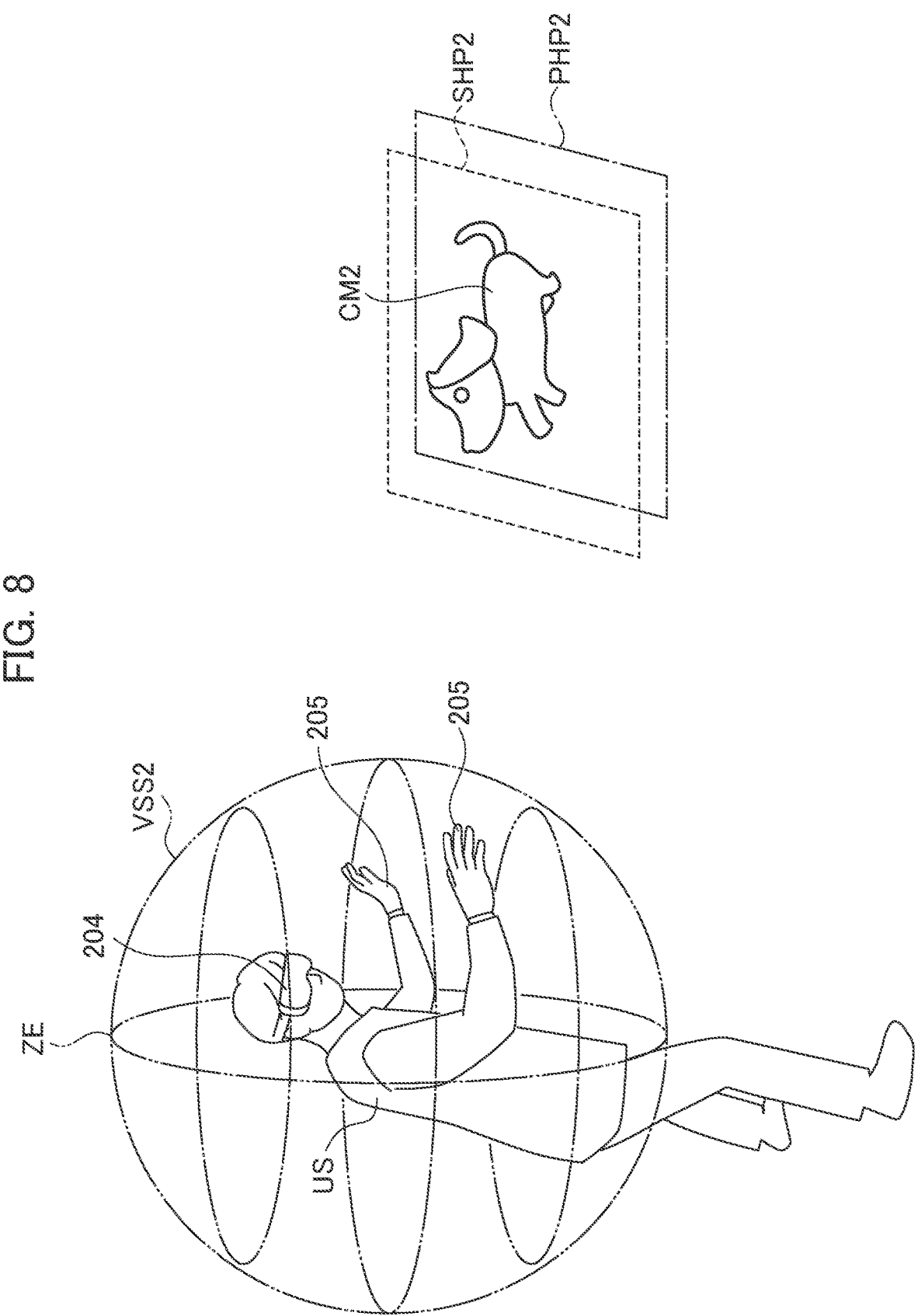
FIG. 8 is a view illustrating a relationship between the horizontal plane of the shooting image and the horizontal plane of the composite image.

When it is determined in step S204 that the composite image CM2 is synthesized with the shooting image IM2 and displayed on the image display 204 (YES), the image processor 211 executes, in step S205, a process for separating the horizontal plane SHP2 of the composite image CM2 from the horizontal plane PHP2 of the shooting image IM2. FIG. 8 schematically illustrates a state in which the horizontal plane SHP2 of the composite image CM2 and the horizontal plane PHP2 of the shooting image IM2 are separated.

If it is determined in step S204 that the composite image CM2 is synthesized with the shooting image IM2 and is not displayed on the image display 204 (NO), the image processor 211 advances the process to step S206.

The user US rotates the spherical image VSS2 so that the shooting image IM2 is horizontal. Since the horizontal plane SHP2 of the composite image CM2 is separated from the horizontal plane PHP2 of the shooting image IM2, the composite image CM2 is not rotated even if the spherical image VSS2 is rotated. Therefore, the user US can easily correct the horizontal position of the shooting image IM2 without being confused by the rotation of the composite image CM2.

In step S205, the image processor 211 may hide the composite image CM2. Since the composite image CM2 is not obstructed by making the composite image CM2 invisible, the user US can easily correct the horizontal position of the shooting image IM2.

In step S206, the image processor 211 moves the shooting image IM2 displayed on the image display 204 in accordance with the rotation of the spherical image VSS2. The user US may rotate the spherical image VSS2 a plurality of times until the shooting image IM2 becomes horizontal.

Figure 6B:
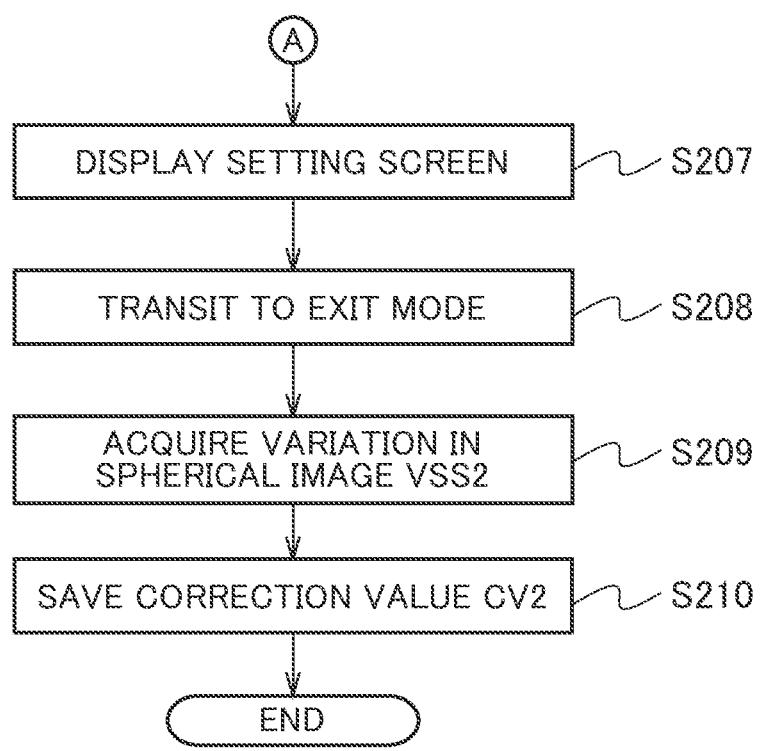
FIG. 6B is a flowchart illustrating an example of the image adjustment method according to the second embodiment.

In FIG. 6B, when the user US determines that the shooting image IM2 is horizontal, the controller 205 is operated so that the image processor 211 terminates the display of the spherical image VSS2 in step S207 and causes the image display 204 to display the setting screen. By making the shooting image IM2 displayed on the image display 204 horizontal, the zenith of the camera 202 and the zenith of the user US can be matched.

When the user US operates the controller 205 to select a predetermined item (e.g. end item) displayed on the setting screen, the image processor 211 shifts the processing to a predetermined processing mode corresponding to the selected item in step S208. When the item to be ended is selected, the image processor 211 shifts the processing to a processing mode (end horizontal adjustment mode) for ending the horizontal adjustment.

In step S209, the image processor 211 acquires the amount of rotation before and after the rotation (rotation angle) of the spherical image VSS2 as the amount of change of the spherical image VSS2. In step S210, the image processor 211 stores the change amount of the spherical image VSS2 as the correction value CV2.

If the composite image CM2 is not displayed in steps S201 to S210 of FIGS. 6A and 6B, the user US operates the controller 205 so that the image adjustor 210 (more specifically, the image processor 211) acquires the composite image CM2 generated by the image generator 212 and displays it on the image display 204.

An image adjustor 210 (more specifically, the image processor 211) analyzes a shooting image IM2 imaged by a camera 202 to recognize a horizontal direction in the shooting image IM2. After the user US rotates the spherical image VSS2 to adjust the horizontal position of the shooting image IM2, when the image adjustor 210 acquires the composite image CM2 generated by the image generator 212 and displays the composite image CM2 on the image display 204, the horizontal plane SHP2 of the composite image CM2 does not coincide with the horizontal plane PHP2 of the shooting image IM2. When the horizontal plane PHP2 of the shooting image IM2 deviates from the horizontal plane SHP2 of the composite image CM2, the user US feels a sense of incongruity.

In FIG. 7, the image processor 211 determines in step S211 whether or not the composite image CM2 is synthesized with the shooting image IM2 and displayed on the image display 204. If it is determined that the composite image CM2 is synthesized with the shooting image IM2 and displayed on the image display 204 (YES), the image processor 211 acquires the stored correction value CV2 in step S212.

In step S213, the image processor 211 rotates the coordinate axis of the composite image CM2 based on the correction value CV2, and makes the horizontal plane SHP2 of the composite image CM2 coincide with the horizontal plane PHP2 of the shooting image IM2 horizontally adjusted by the user US. In step S214, the image processor 211 performs arithmetic processing on the composite image CM2 based on the corrected horizontal plane SHP2 to adjust the image. FIG. 8 schematically illustrates a state in which the horizontal plane SHP2 of the composite image CM2 coincides with the horizontal plane PHP2 of the shooting image IM2.

If it is determined in step S211 that the shooting image IM2 is not horizontally adjusted by the user US (NO), the image processor 211 shifts the processing to step S215. In step S215, the image processor 211 synthesizes the adjusted composite image CM2 with the shooting image IM2 and displays the composite image CM2 on the image display 204. The user US can watch the shooting image IM2 and the composite image CM2 which are displayed on the image display 204 and whose horizontal lines coincide with each other.

In the image adjustment system 201, the image adjustor 210, and the image adjustment method according to the second embodiment, the image display 204 displays the spherical image VSS2. With the image adjustment system 201, the image adjustor 210, and the image adjustment method according to the second embodiment, when the horizontal direction of the shooting image IM2 is erroneously detected or when the horizontal direction or the zenith ZE designation is deviated, the user US operates the controller 205 to rotate the spherical image VSS2, so that the shooting image IM2 displayed on the image display 204 can be adjusted to be horizontal.

Therefore, with the image adjustment system 201, the image adjustor 210, and the image adjustment method according to the second embodiment, when the horizontal direction of the shooting image IM2 is erroneously detected or the horizontal or zenith designation is shifted, the user US can easily correct the horizontal or zenith of the shooting image IM2.

With the image adjustment system 201, the image adjustor 210, and the image adjustment method according to the second embodiment, when the correction value CV2 is stored, the image processor 211 reads the correction value CV2, adjusts the shooting image IM2 imaged by the camera 202 based on the correction value CV2, and displays the image on the image display 204.

In the image adjustment system 201, the image adjustor 210, and the image adjustment method according to the second embodiment, the horizontal plane SHP2 of the composite image CM2 and the horizontal plane PHP2 of the shooting image IM2 are separated, the horizontal plane of the shooting image IM2 is adjusted, and the horizontal plane of the composite image CM2 is adjusted based on the adjustment result (correction value CV2). Since the horizontal plane SHP2 of the composite image CM2 is separated from the horizontal plane PHP2 of the shooting image IM2, the composite image CM2 is not rotated even when the user US rotates the spherical image VSS2. Therefore, the user US can easily correct the horizontal position of the shooting image IM2.

With the image adjustment system 201, the image adjustor 210, and the image adjustment method according to the second embodiment, when the shooting image IM2 is horizontally adjusted, the coordinate axis of the composite image CM2 is rotated based on the correction value CV2, and the horizontal plane SHP2 of the composite image CM2 is made to coincide with the horizontal plane PHP2 of the shooting image IM2. Therefore, the user US can watch the shooting image IM2 and the composite image CM2 displayed on the image display 204 without feeling a sense of incongruity.

Third Embodiment

Figure 9:
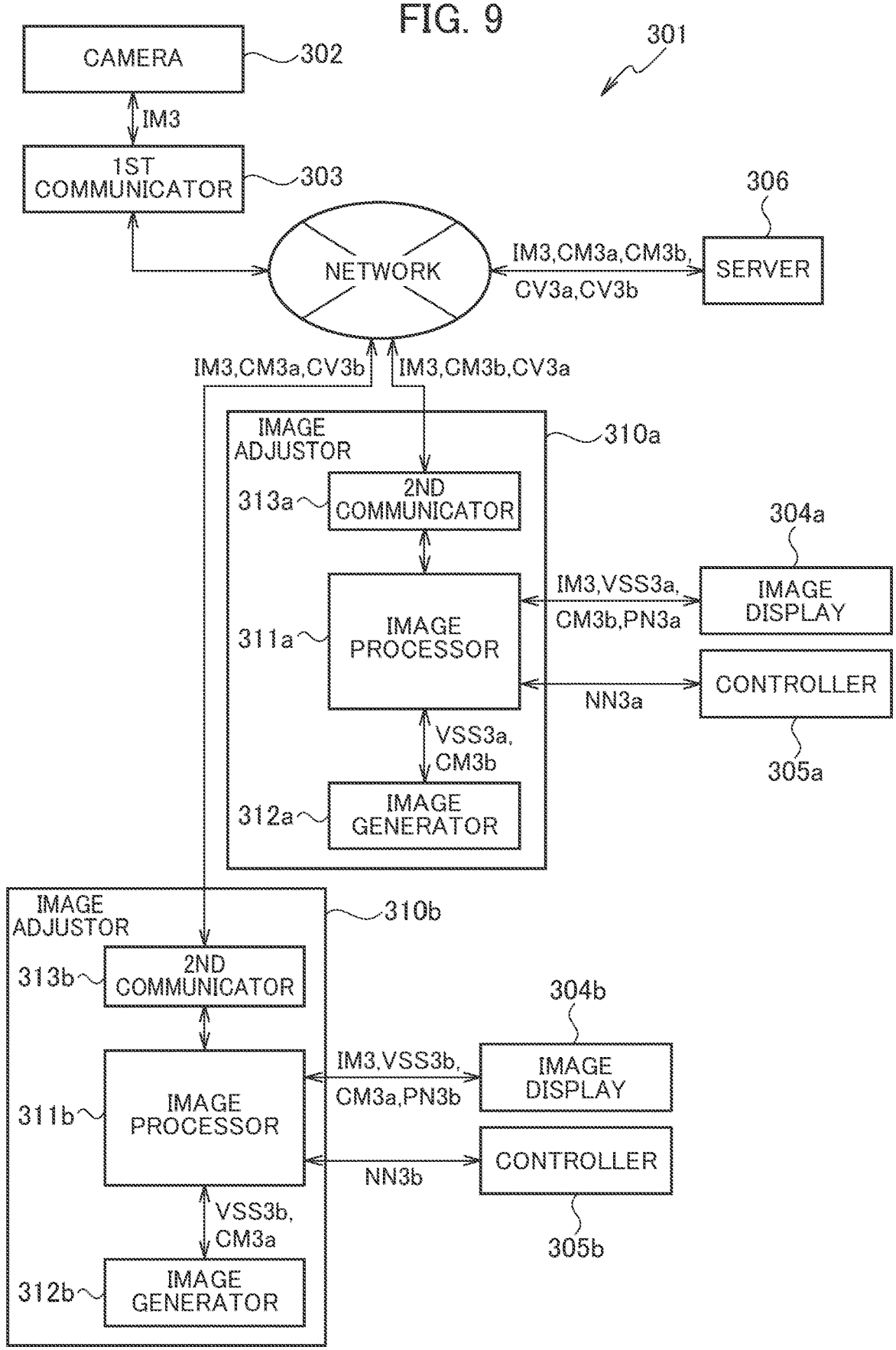
FIG. 9 is a block diagram illustrating an image adjustment system according to a third embodiment.

With reference to FIG. 9, a configuration example of a image adjustment system 301 according to a third embodiment will be described. The image adjustment system 301 according to the third embodiment includes a camera 302, a first communicator 303, a plurality of image displays 304, a plurality of controllers 305, a plurality of image adjustors 310, and a server 306. Each of the image adjustors 310 includes an image processor 311, an image generator 312, and a second communicator 313.

The camera 302, the first communicator 303, each of the image displays 304, each of the controllers 305, each of the image adjustors 310, and the server 306 of the third embodiment correspond to the camera 102, the first communicator 103, the image display 104, the controller 105, the image adjustor 110, and the server 106 of the first embodiment, respectively. The image processor 311, the image generator 312, and the second communicator 313 of the third embodiment correspond to the image processor 111, the image generator 112, and the second communicator 113 of the first embodiment, respectively.

FIG. 9 illustrates two image displays 304, two controllers 305, and two image adjustors 310, respectively, for the sake of explanation. The image displays 304, the controllers 305, and the image adjustor 310 may be three or more. The image display 304 used by a first user USa is referred to as a first image display 304a, the controller 305 is referred to as a first controller 305a, and the image adjustor 310 is referred to as a first image adjustor 310a. The image display 304 used by a second user USb is referred to as a second image display 304b, the controller 305 is referred to as a second controller 305b, and the image adjustor 310 is referred to as a second image adjustor 310b.

In the first image adjustor 310a, the image processor 311 is referred to as an image processor 311a, the image generator 312 is referred to as an image generator 312a, and the second communicator 313 is referred to as a second communicator 313a. In the second image adjustor 310a, the image processor 311 is referred to as an image processor 311a, the image generator 312 is referred to as an image generator 312a, and the second communicator 313 is referred to as a second communicator 313a.

The first image adjustor 310a can acquire a shooting image IM3 imaged by the camera 302 through the first communicator 303, the second communicator 310a of the first image adjustor 313a and the network. The second image adjustor 310b can acquire the shooting image IM3 imaged by the camera 302 through the first communicator 303, the second communicator 310b of the second image adjustor 313b and the network.

The server 306 may acquire the shooting image IM3 shooting by the camera 302 via the first communicator 303 and the network, the first image adjustor 310a may acquire the shooting image IM3 from the server 306 via the network and the second communicator 310a of the first image adjustor 313a, and the second image adjustor 310b may acquire the shooting image IM3 from the server 306 via the network and the second communicator 310b of the second image adjustor 313b.

The server 306 can identify the first user USa or the first image display 304a by performing a login operation by the first user USa or by connecting the first image display 310a to the network through the second communicator 313a of the first image adjustor 304a. The server 306 can specify the second user USb or the second image display 304b by executing a login operation by the second user USb or by connecting the second image display 310b to the network through the second communicator 313b of the second image adjustor 304b.

The processes performed by the first image adjustor 310a, the first image display 304a, and the first controller 305a will be described below. The symbols in parentheses indicate the processes performed by the second image adjustor 310b, the second image display 304b, and the second controller 305b.

The shooting image IM3 acquired by the image adjustor 310a (310b) is input to the image processor 311a (311b). The image processor 311a (311b) analyzes the shooting image IM3 to recognize the horizontal direction of the shooting image IM3. The image processor 311a (311b) may analyze the shooting image IM3 to recognize the vertical direction in the shooting image IM3, or may recognize the horizontal direction and the vertical direction.

The image adjustor 310a (310b) corrects the distortion of the shooting image IM3, performs image processing such as adjusting the horizontal position of the shooting image IM3, and outputs the image-processed shooting image IM3 to the image display 304a (304b).

The server 306 may correct distortion of the shooting image IM3 imaged by the camera 302, perform image processing such as adjusting the horizontal position of the shooting image IM3, and output the image-processed shooting image IM3 to the image adjustor 310a (310b). The image display 304a (304b) displays the shooting image IM3 subjected to image processing by the image adjustor 310a (310b) or the server 306.

When the user USa (USb) mounts the image display 304a (304b) on the head thereof, the user can watch the shooting image IM3 subjected to image processing by the image adjustor 310a (310b) or the server 306.

While the image display 304a (304b) is mounted on the head of the user USa (USb), the image display 304a (304b) generates attitude information PN3a (PN3b) based on the direction in which the user USa (USb) faces and the attitude or the like of the user USa (USb). The image processor 311a (311b) acquires the attitude information PN3a (PN3b) from the image display 304a (304b). That is, the image processor 311a (311b) acquires the attitude information PN3a (PN3b) based on the attitude of the image display 304a (04b).

The image processor 311a (311b), based on the attitude information PN3a (PN3b), displays, from the shooting image IM3 imaged by the camera 302, an image of an area corresponding to the direction in which the user USa (USb)

faces and the state such as the attitude of the user USa (USb) on the image display 304a (304b).

While the controller 305a (305b) is attached to the hand of the user USa (USb), the controller 305a (305b) generates instruction information NN3a (NH3b) based on a state such as the movement or attitude of the hand of the user USa (USb). The image processor 311a (311b) acquires the instruction information NN3a HN3b) from the controller 305a (305b). The image processor 311a (311b) can change or adjust the shooting image IM3 displayed on the image display 304a (304b) based on the instruction information NN3a (NN3b).

The image generator 312a (312b) generates a composite image CM3b (CM3a) which is a CG to be synthesized with the shooting image IM3. The composite image CM3a (CM3b) is an image of a character such as an avatar. The composite image CM3a generated by the second image generator 312b is the avatar of the first user USa, and the composite image CM3b generated by the first image generator 312a is the avatar of the second user USb. When the user USa (USb) operates the controller 305a (305b), the image generator 312a (312b) generates a composite image CM3b (CM3a), which is the avatar of the user USb (USa), and stores the composite image CM3b in a built-in memory or an external memory.

The image processor 311a (311b) may acquire the composite image CM3b (CM3a) generated by the image generator 312a (312b) and output it to the server 306 via the second communicator 313a (313b) and the network.

When the user USa (USb) operates the controller 305a (305b), the image generator 312a (312b) may generate a composite image CM3a (CM3b) which is the avatar of the user USa (USb). The image processor 311a (311b) may acquire the composite image CM3a (CM3b) generated by the image generator 312a (312b) and output it to the server 306 via the second communicator 313a (313b) and the network. That is, the first user USa may set the avatar of the second user USb or may set its own avatar. The second user USb may set the avatar of the first user USa or may set its own avatar.

The server 306 stores the composite image CM3a (CM3b) in a built-in memory or an external memory in association with the user USa (USb). The server 306 may automatically set the composite image CM3a (CM3b) in association with the user USa (USb) and store it in the built-in memory or the external memory.

Based on the instruction information NN3a (NN3b), the image processor 311a (311b) acquires the composite image CM3b (CM3a) from the image generator 312a (312b) or the server 306, and synthesizes the composite image CM3b (CM3a) with the shooting image IM3 displayed on the image display 304a (304b). Therefore, the image display 304a (304b) can display the shooting image IM3 imaged by the camera 302 and the composite image CM3b (CM3a) acquired from the image generator 312a (312b) or the server 306 and synthesized with the shooting image IM3.

The image generator 312a (312b) generates a spherical image VSS3a (VSS3b) that is a virtual image formed of a spherical surface that is CG. The image generator 312a (312b) stores the spherical image VSS3a (VSS3b) in a built-in memory or an external memory. The image processor 311a (311b) acquires, based on the instruction information NN3a (NN3b), the spherical image VSS3a (VSS3b) generated by the image generator 312a (312b) and displays it on the image display 304a (304b).

The spherical image VSS3a (VSS3b) of the third embodiment corresponds to the spherical image VSS1 of the first embodiment. The user USa (USb) moves the hand on which the controller 305a (305b) is mounted to a position corresponding to the spherical image VSS3a (VSS3b) displayed on the image display 304a (304b), and feels as if the hand of the user USa (USb) is in contact with the spherical image VSS3a (VSS3b).

The controller 305a (305b) may have an actuator disposed in a portion of the user USa (USb) in contact with the hand. Based on the instruction information NN3a (NN3b), the image processor 311a (311b) operates the actuator when it is determined that the hand of the user USa (USb) has moved to a position corresponding to the spherical image VSS3a (VSS3b). When the actuator applies pressure to the hand of the user USa (USb), the user USa (USb) can feel the sensation that the hand contacts the spherical image VSS3a (VSS3b).

While the spherical image VSS3a (VSS3b) is displayed on the image display 304a (304b), when the user USa (USb) moves the hand on which the controller 305a (305b) is attached in an arbitrary direction, the image processor 311a (311b), based on the instruction information NN3a (NN3b), performs image processing so that the spherical image VSS3a (VSS3b) and the shooting image IM3 displayed on the image display 304a (304b) move in accordance with the moving direction, moving speed and position of the hand of the user USa (USb).

The user USa (USb) can rotate the spherical image VSS3a (VSS3b) in an arbitrary direction to an arbitrary position at an arbitrary speed by moving the hand in an arbitrary direction to an arbitrary position at an arbitrary speed. That is, the user USa (USb) can rotate the spherical image VSS3a (VSS3b) by the hand movement. The image processor 311a (311b) moves the shooting image IM3 in accordance with the rotation of the spherical image VSS3a (VSS3b).

The image processor 311a (311b) can determine to which position on the coordinate of the spherical image VSS3a (VSS3b) the zenith ZE of the user USa before the user USa rotates the spherical image VSS3a (VSS3b) has moved by the user USa (USb) rotating the spherical image VSS3a (VSS3b).

The image processor 311a (311b) calculates, based on the moving direction of the zenith ZE and the position of the moving destination on the coordinate of the spherical image VSS3a (VSS3b), the amount of change in the spherical image VSS3a (VSS3b) between the time before and after the user USa (USb) rotates the spherical image VSS3a (VSS3b). The change amount of the spherical image VSS3a (VSS3b) of the third embodiment corresponds to the change amount of the spherical image VSS1 of the first embodiment.

The image processor 311a (311b) stores the amount of change in the spherical image VSS3a (VSS3b) as the correction value CV3a (CV3b). The correction value CV3a (CV3b) of the third embodiment corresponds to the correction value CV1 of the first embodiment. The image processor 311a (311b) may store the coordinates on the spherical image VSS3a (VSS3b) of the zenith ZE after the user USa (USb) rotates the spherical image VSS3a (VSS3b) as the correction value CV3a (CV3b).

The image processor 311a (311b) may store the correction value CV3a (CV3b) in a built-in memory or an external memory, or may output the correction value CV3a (CV3b) to the server 306 via the second communicator 313a (313b) and the network. The server 306 stores the correction value CV3a (CV3b) in a built-in memory or an external memory in association with the image display 304a (304b) or the user USa (USb).

The image adjustment system 301 can display the composite image CM3b (CM3a), which is an avatar of another user USb (USa), on the image display 304a (304b) mounted on the user USa (USb), by synthesizing the composite image CM3b (CM3a) with the shooting image IM3.

When the user USa (USb) watches the shooting image IM3 imaged by the camera 302, the user USa (USb) feels as if the user USa (USb) is watching around the camera 302 from the position thereof. In such a case, the image display 304a (304b) watched by the user USa (USb) displays the composite image CM3b (CM3a), which is an avatar of another user USb (USa), at the position of the user USa (USb), so that the user USa (USb) feels a sense of incongruity. When there are a plurality of other users US, avatars of the plurality of other users USb, USc, . . . are overlapped and displayed at the position of the user USa.

In the server 306, positional relationships among the plurality of users USa, USb, . . . are preset. In other words, the server 306 stores positional setting information indicating positional relationships among a plurality of users USa, USb, . . . . The positional relationship among the plurality of users USa, USb, . . . may be automatically set by the server 306, or may be independently set by the plurality of users USa, USb, . . . .

Figure 10:
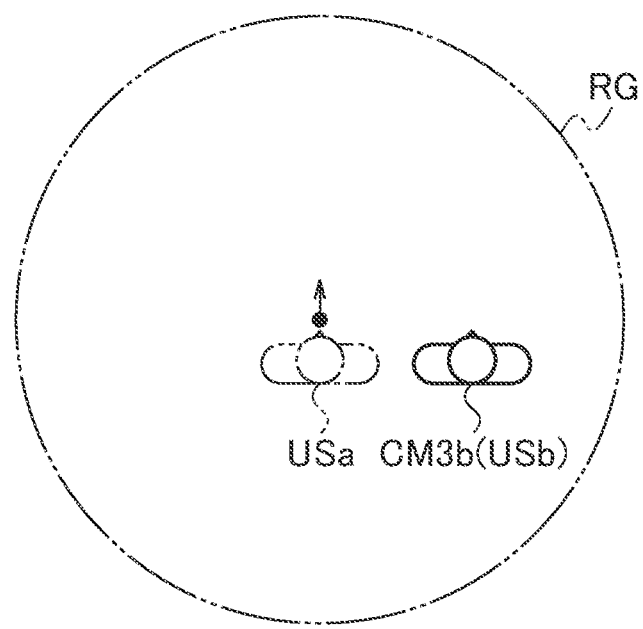
FIG. 10 is a diagram illustrating an example of a positional relationship between a user and a composite image corresponding to another user when the user is watching an image display.
Figure 11:
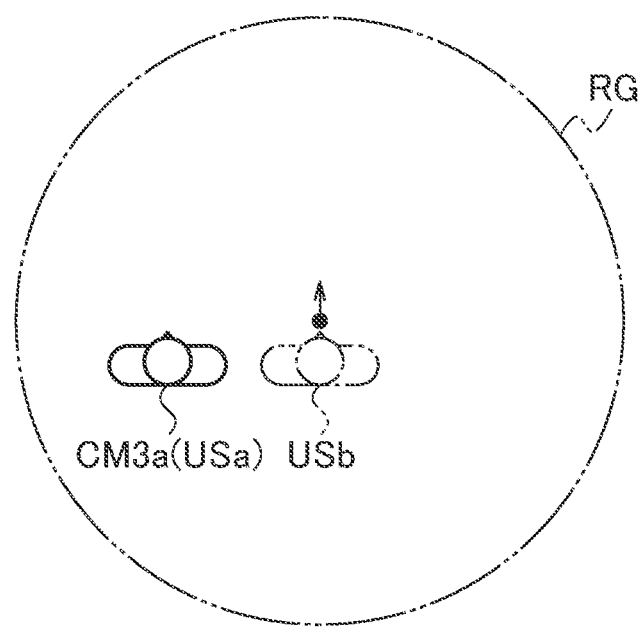
FIG. 11 is a diagram illustrating an example of a positional relationship between a user and a composite image corresponding to another user when the user is watching an image display.

FIG. 10 illustrates an example of the positional relationship between the first user USa and the composite image CM3b which is the avatar of the second user USb when the first user USa is watching the first image display 304a. FIG. 11 illustrates an example of the positional relationship between the second user USb and the composite image CM3a which is the avatar of the first user USa when the second user USb is watching the second image display 304b.

The black dots illustrated in FIGS. 10 and 11 indicate the position of the camera 302. Arrows illustrated in FIGS. 10 and 11 indicate the moving direction of the camera 302. That is, FIG. 10 illustrates a state in which the first user USa faces the moving direction of the camera 302, and FIG. 11 illustrates a state in which the second user USb faces the moving direction of the camera 302. Therefore, in each of FIGS. 10 and 11, the first user USa and the second user USb are watching the same shooting image IM3.

In such a case, when the composite image CM3b is displayed at a position away from the first user USa or the composite image CM3a is displayed at a position away from the second user USb, both the first user USa and the second user USb feel uncomfortable. Therefore, it is desirable to display the composite image CM3b (CM3a) at a position within a predetermined range RG from the position of the user USa (USb) (Camera 302).

As illustrated in FIG. 10, in the server 306, for example, in the first user USa or the first image display 304a, the positional relationship between the first user USa and the second user USb is set so that the composite image CM3b is arranged side by side on the right side of the first user USa. As illustrated in FIG. 11, in the server 306, for example, in the second user USb or the second image display 304b, the positional relationship between the first user USa and the second user USb is set so that the composite image CM3a is arranged side by side on the left side of the second user USb.

That is, in FIGS. 10 and 11, the positional relationship between the first user USa and the second user USb is set so that when the moving direction of the camera 302 is the forward direction of the first user USa and the second user USb, the second user USb is arranged side by side on the right side of the first user USa. Therefore, the first user USa always watches the second user USb on the right side, and the second user USb always watches the first user USa on the left side. When the camera 360, which is a camera 302, is stationary, there is no reference for the front, back, right, and left, so that it is desirable to determine the positional relationship between the first user USa and the second user USb at the time of initialization.

With reference to the flowcharts illustrated in FIGS. 12 and 13, an example of an image adjustment method according to the third embodiment will be described. Concretely, an example of a method for synthesizing the composite image CM3 with the shooting image IM3 will be described. The processes performed by the first image adjustor 310a, the first image display 304a, and the first controller 305a will be described below. The symbols in parentheses indicate the processes performed by the second image adjustor 310b, the second image display 304b, and the second controller 305b.

The image display 304a (304b) is mounted on the head of the user USa (USb), and the controller 305a (305b) is attached on the hand of the user USa (USb). The image display 304a (304b) displays the shooting image IM3.

Figure 12:
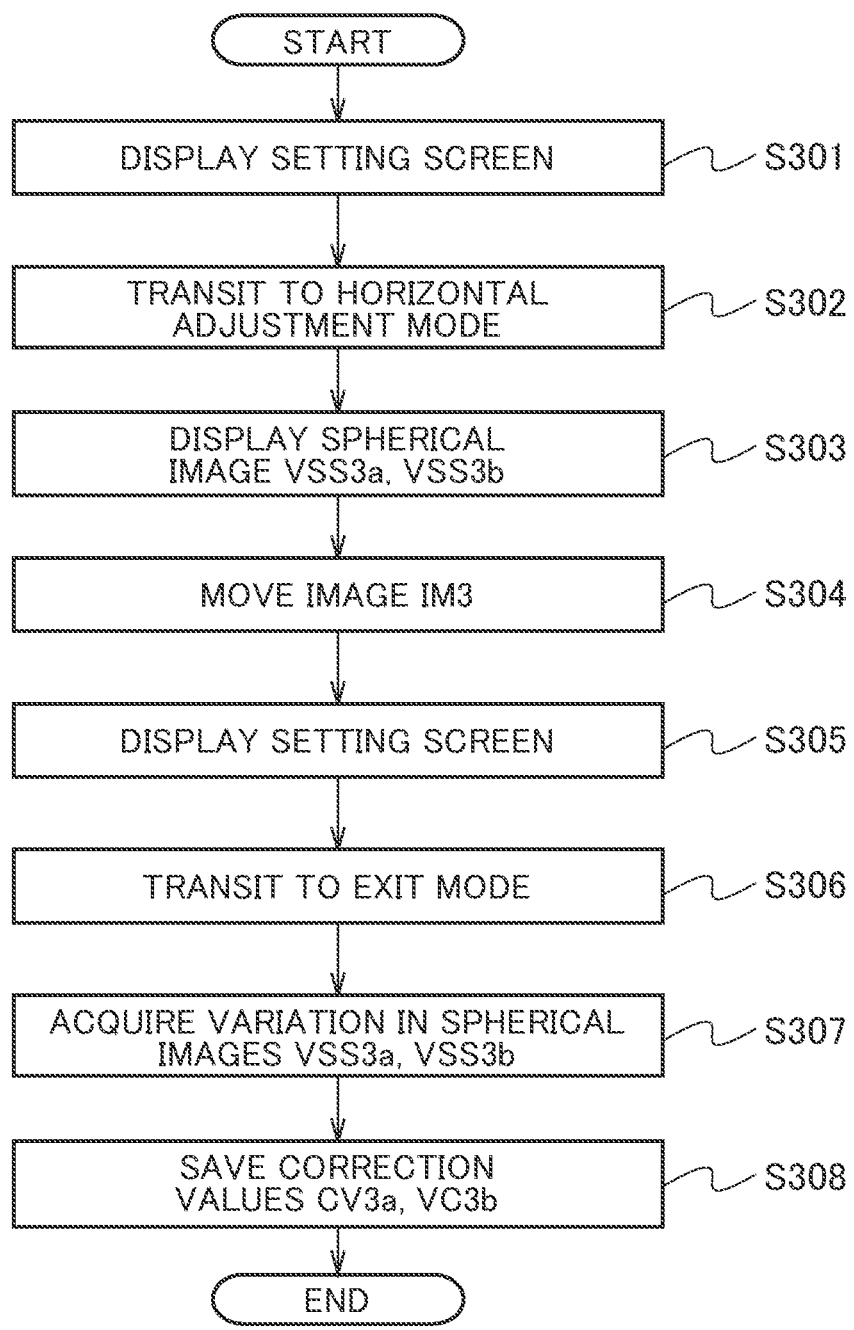
FIG. 12 is a flowchart illustrating an example of an image adjustment method according to the third embodiment.

If the user USa (USb) determines that the shooting image IM3 displayed on the image display 304a (304b) is not horizontal, in FIG. 12, the user USa (USb) operates the controller 305a (305b), whereby the image processor 311a (311b) causes the image display 304a (304b) to display a setting screen in step S301.

When the user USa (USb) operates the controller 305a (305b) to select a predetermined item (e.g. horizontal adjustment items) displayed on the setting screen, the image processor 311a (311b) shifts the processing to a predetermined processing mode corresponding to the selected item in step S302. When the horizontal adjustment item is selected, the image processor 311a (311b) shifts the processing to a processing mode (horizontal adjustment mode) for adjusting the horizontal of the shooting image IM3.

In step S303, the image processor 311a (311b) acquires the spherical image VSS3a (VSS3b) generated by the image generator 312a (312b) and displays it on the image display 304a (304b). The image display 304a (304b) displays a mixture of the shooting image IM3 and the spherical image VSS3a (VSS3b).

The user USa (USb) rotates the spherical image VSS3a (VSS3b) so that the shooting image IM3 is horizontal, and the image processor 311a (311b) moves the shooting image IM3 displayed on the image display 304a (304b) in step S304 in accordance with the rotation of the spherical image VSS3a (VSS3b). The user USa (USb) may perform the operation of rotating the spherical image VSS3a (VSS3b) a plurality of times until the shooting image IM3 becomes horizontal.

When the user USa (USb) determines that the shooting image IM3 is horizontal, the controller 305a (305b) is operated so that the image processor 311a (311b) terminates the display of the spherical image VSS3a (VSS3b) in step S305 and causes the image display 304a (304b) to display the setting screen. By leveling the shooting image IM3 displayed on the image display 304a (304b), the zenith of the camera 302 and that of the user USa (USb) can be matched.

When the user USa (USb) operates the controller 305a (305b) to select a predetermined item (For example, end item) displayed on the setting screen, the image processor 311a (311b) shifts the processing to a predetermined processing mode corresponding to the selected item in step S306. When the item to be ended is selected, the image processor 311a (311b) shifts the processing to a processing mode (exit mode) for ending the horizontal adjustment.

In step S307, the image processor 311a (311b) acquires the amount of rotation before and after the rotation (rotation angle) of the spherical image VSS3a (VSS3b) as the amount of change of the spherical image VSS3a (VSS3b). In step S308, the image processor 311a (311b) stores the amount of change in the spherical image VSS3a (VSS3b) as the correction value CV3a (CV3b), and ends the process.

With reference to a flowchart illustrated in FIG. 13, a case will be described in which the composite image CM3b, which is the avatar of the second user USb, is displayed on the first image display 304a watched by the first user USa in synthesizing with the shooting image IM3. The reference numerals in parentheses indicate a case where the second image display 304b watched by the second user USb displays the composite image CM3a, which is the avatar of the first user USa, by synthesizing with the shooting image IM3.

Figure 13:
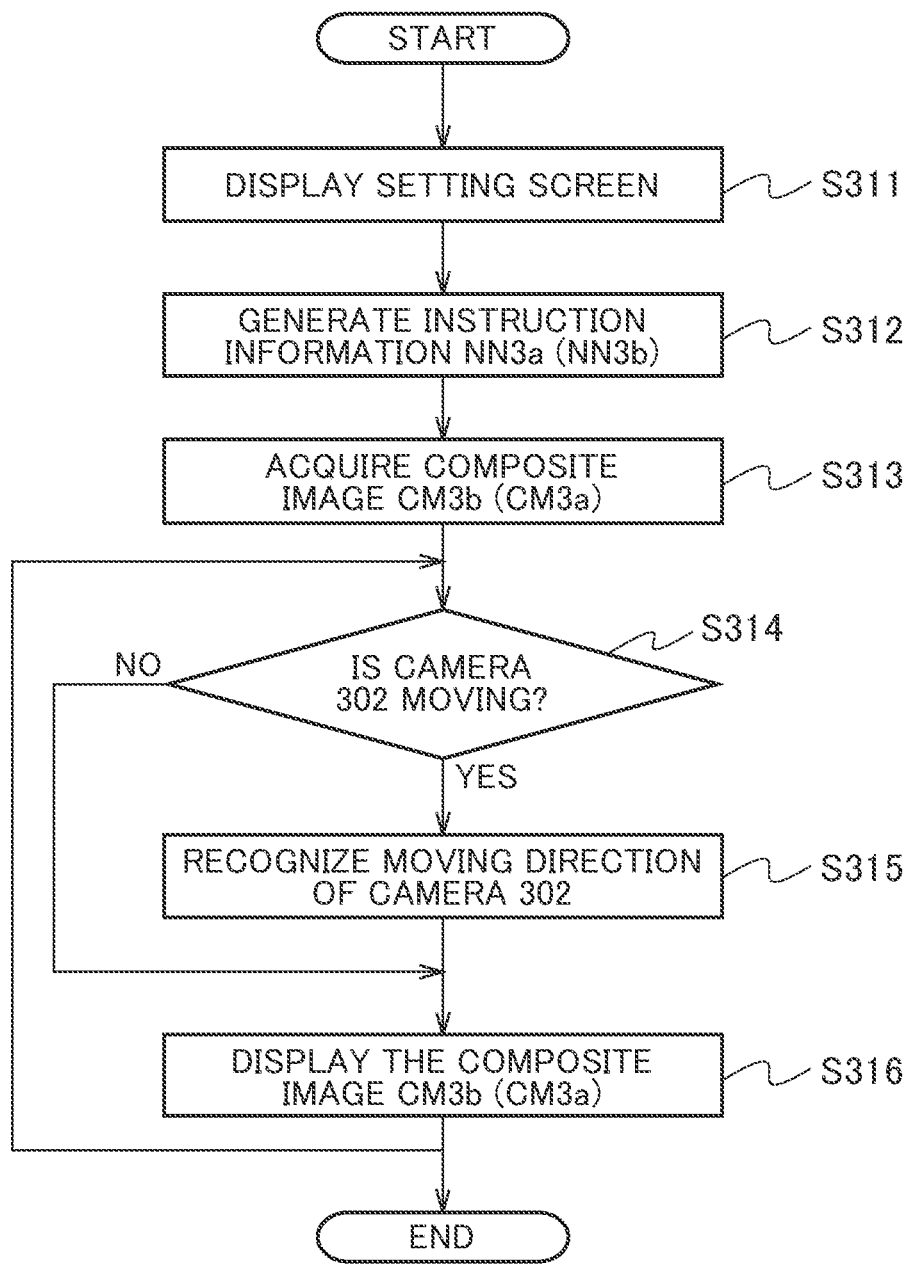
FIG. 13 is a flowchart illustrating an example of the image adjustment method according to the third embodiment.

In FIG. 13, when the user USa (USb) operates the controller 305a (305b), the image processor 311a (311b) causes the image display 304a (304b) to display the setting screen in step S311. The setting screen displays an avatar selection item for selecting an avatar of another user US, for example.

The user USa (USb) selects, for example, the user USb (USa) as the other user US. In step S312, the controller 305a (305b) generates instruction information NN3a (USa) in accordance with the selection of the other user USb, and outputs the instruction information NN3a (NN3b) to the image processor 311a (311b).

In step S313, the image processor 311a (311b) acquires the composite image CM3b (CM3a) based on the instruction information NN3a (NN3b). When the composite image CM3b (CM3a) is stored in the server 306, the image processor 311a (311b) acquires the composite image CM3b (CM3a) from the server 306 via the second communicator 313a (313b) and the network.

In step S314, the image processor 311a (311b) determines whether or not the camera 302 is moving. If it is determined in step S314 that the camera 302 is moving (YES), the image processor 311a (311b) recognizes the moving direction of the camera 302 in step S315. The image processor 311a (311b) determines, based on the shooting image IM3, whether or not the camera 302 is moving, and can recognize the moving direction of the camera 302.

In step S316, the image processor 311a (311b) synthesizes the composite image CM3b (CM3a) with the shooting image IM3 so that the composite image CM3b (CM3a) is disposed, for example, on the right (left) side of the user USa (USb) with respect to the moving direction of the camera 302, and causes the image display 304a (304b) to display the composite image CM3b (CM3a).

When it is determined in step S314 that the camera 302 is not moving (NO), the image processor 311a (311b) determines that the camera 302 is stationary, and in step S316, based on the positional relationship between the first user USa and the second user USb determined in the initial setting, the composite image CM3b (CM3a) is composited with the shooting image IM3 and displayed on the image display 304a (304b).

In the image adjustment system 301, the image adjustor 310, and the image adjustment method according to the third embodiment, the image display 304 displays the spherical image VSS3. With the image adjustment system 301, the image adjustor 310, and the image adjustment method according to the third embodiment, when the horizontal direction of the shooting image IM3 is erroneously detected or when the horizontal direction or the designation of the zenith ZE is deviated, the user US operates the controller 305 to rotate the spherical image VSS3, so that the shooting image IM3 displayed on the image display 304 can be adjusted to be horizontal.

Therefore, with the image adjustment system 301, the image adjustor 310, and the image adjustment method according to the third embodiment, when the horizontal direction of the shooting image IM3 is erroneously detected or the horizontal or zenith designation is shifted, the user US can easily correct the horizontal or zenith of the shooting image IM3.

According to the image adjustment system 301, the image adjustor 310, and the image adjustment method according to the third embodiment, when the correction value CV3 is stored, the image processor 311 reads the correction value CV3, adjusts the shooting image IM3 imaged by the camera 302 based on the correction value CV3, and displays the image on the image display 304.

In the image adjustment system 301, the image adjustor 310, and the image adjustment method according to the third embodiment, the positional relationships of the plurality of users US are preset. As a result, the shooting image IM3 displayed on the image display 304a (304b) can display the composite image CM3b (CM3a), which is the avatar of the other user USb (USa), after being synthesized into a position based on a preset positional relationship.

With the image adjustment system 301, the image adjustor 310, and the image adjustment method according to the third embodiment, when the user USa (USb) watches the shooting image IM3 imaged by the camera 302, the composite image CM3b (CM3a), which is the avatar of the other user USb (USa), is displayed in the vicinity of the user USa (USb), so that the user USa (USb) can feel as if the user USa (USb) is watching the same shooting image IM3 as the other user USb (USa) without feeling any discomfort.

Fourth Embodiment

Figure 14:
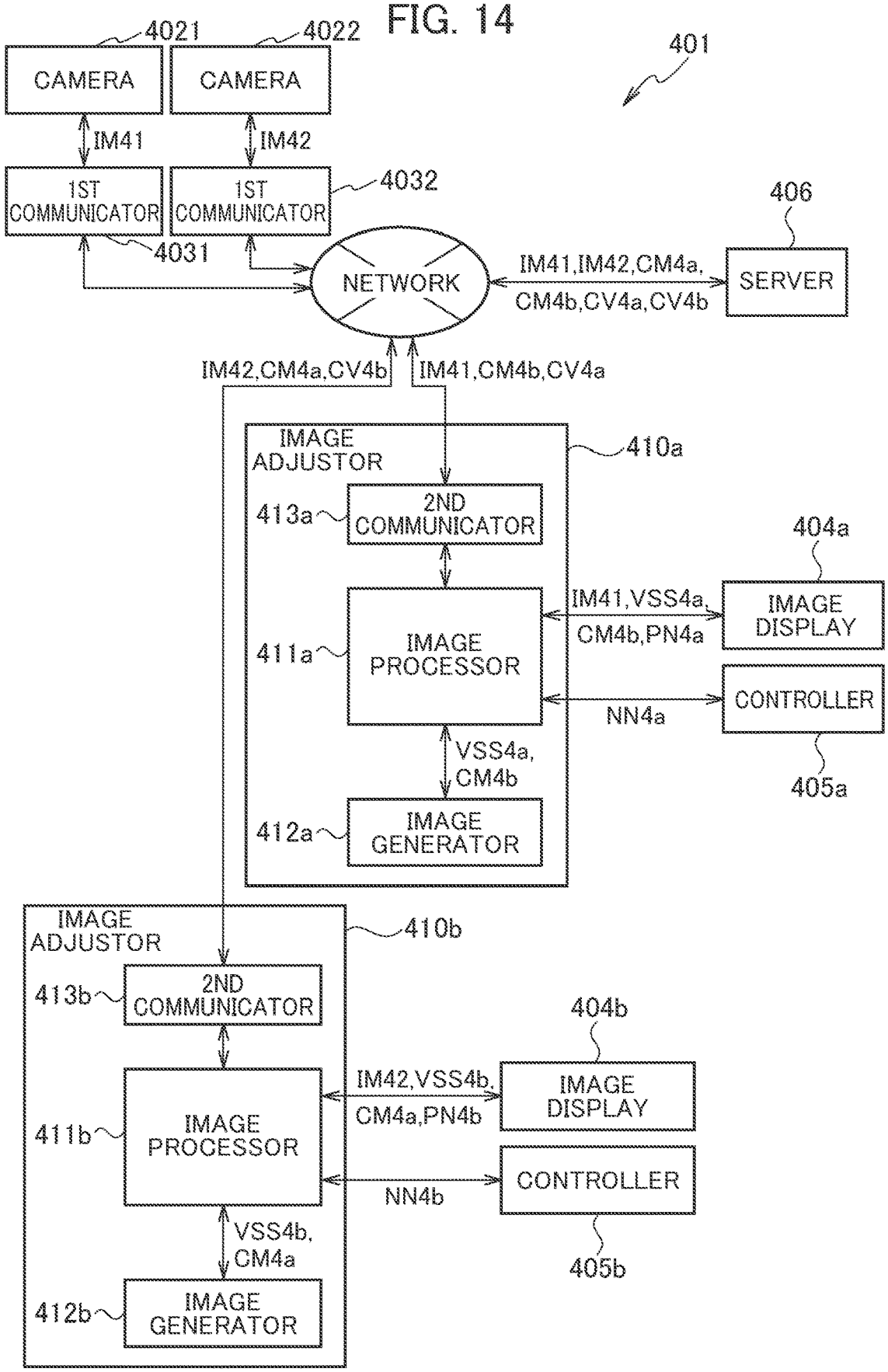
FIG. 14 is a block diagram illustrating an image adjustment system according to a fourth embodiment.

With reference to FIG. 14, a configuration example of an image adjustment system 401 according to a fourth embodiment will be described. The image adjustment system 401 according to the fourth embodiment includes a plurality of cameras 402, a plurality of first communicators 403, a plurality of image displays 404, a plurality of controllers 405, a plurality of image adjustors 410, and a server 406. Each of the image adjustor 410 includes an image processor 411, an image generator 412, and a second communicator 413.

Each of the cameras 402, each of the first communicators 403, and each of the image displays 404 of the fourth embodiment correspond to the camera 102, the first communicator 103, and the image display 104 of the first embodiment, respectively. Each of the controller 405, each of the image adjustors 410, and the server 406 of the fourth embodiment correspond to the controller 105, the image adjustor 110, and the server 106 of the first embodiment, respectively. The image processor 411, the image generator 412, and the second communicator 413 of the fourth embodiment correspond to the image processor 111, the image generator 112, and the second communicator 113 of the first embodiment, respectively.

FIG. 14 illustrates two cameras 402, two first communicators 403, two image displays 404, two controller 405, and two image adjustors 410, respectively, for the sake of explanation. The cameras 402, the first communicators 403, the image displays 404, the controllers 405, and the image adjustors 410 may be three or more. The image display 404, the controller 405, and the image adjustor 410 used by a first user USa are a first image display 404a, a first controller 405a, and a first image adjustor 410a. The image display 404, the controller 405, and the image adjustor 410 used by a second user USb are a second image display 404b, a second controller 405b, and a second image adjustor 410b.

In the second image adjustor 410a, the image processor 411, the image generator 412, and the second communicator 413 are an image processor 411a, an image generator 412a, and a second communicator 413a. In the second image adjustor 410b, the image processor 411, the image generator 412, and the second communicator 413 are an image processor 411b, an image generator 412b, and a second communicator 413b. The first image adjustor 410a is connected to a network via the second communicator 413a of the first image adjustor 410a. The second image adjustor 410b is connected to the network via the second communicator 413b of the second image adjustor 410b.

One of the two cameras 402 is a first camera 4021 and the other is a second camera 4022. One of the two first communicators 403 is a first communicator 4031 and the other is a first communicator 4032. The first camera 4021 is connected to the network via the first communicator 4031, and the second camera 4022 is connected to the network via the first communicator 4032. The first camera 4021 and the second camera 4022 may be connected to the network commonly via the first communicator 4031 or the first communicator 4032. The server 406 is connected to the network.

The first camera 4021 and the second camera 4022 can move independently of each other. The first camera 4021 and the second camera 4022 have a GPS function. The server 406 can continuously acquire positions (current positions) of the first camera 4021 and the second camera 4022 through the network, the one first communicator 4031 and the other first communicator 4032. The first image adjustor 410a can acquire the positions of the first camera 4021 and the second camera 4022 from the server 406 through the second communicator 413a of the first image adjustor 410a and the network. The second image adjustor 410b can acquire the positions of the first camera 4021 and the second camera 4022 from the server 406 through the second communicator 413b of the second image adjustor 410b and the network.

The first image adjustor 410a can acquire a shooting image IM41 imaged by the first camera 4021 through the one first communicator 4031, the second communicator 413a of the first image adjustor 410a, and the network. The second image adjustor 410b can acquire the shooting image IM41 imaged by the first camera 4021 through the one first communicator 4031, the second communicator 413b of the second image adjustor 410b, and the network.

The first image adjustor 410a can acquire a shooting image IM42 imaged by the second camera 4022 through the other first communicator 4032, the second communicator 413a of the first image adjustor 410a, and the network. The second image adjustor 410b can acquire a shooting image IM42 imaged by the second camera 4022 through the other first communicator 4032, the second communicator 413b of the second image adjustor 410b and the network. FIG. 14 illustrates a case where the first image adjustor 410a acquires a shooting image IM41 imaged by the first camera 4021, and the second image adjustor 410b acquires a shooting image IM42 imaged by the second camera 4022.

The server 406 may acquire the shooting image IM41 imaged by the first camera 4021 and the shooting image IM42 imaged by the second camera 4022 via the one first communicator 4031, the other first communicator 4032, and the network. In this case, the first image adjustor 410a acquires the shooting image IM41 imaged by the first camera 4021 and the shooting image IM42 imaged by the second camera 4022 from the server 406 via the network and the second communicator 413a of the first image adjustor 410a. The second image adjustor 410b acquires the shooting image IM41 imaged by the first camera 4021 and the shooting image IM42 imaged by a second camera 4022 from the server 406 through the network and the second communicator 413b of the second image adjustor 410b.

The server 406 can identify the first user USa or the first image display 404a by the first user USa performing a login operation or the first image display 404a being connected to the network through the second communicator 413a. The server 406 can specify the second user USb or the second image display 404b by the second user USb performing a login operation or the second image display 404b being connected to the network through the second communicator 413b.

The server 406 can recognize which shooting image is displayed on which image display. For example, as illustrated in FIG. 14, when the shooting image IM41 imaged by the first camera 4021 is displayed on the first image display 404a and the shooting image IM42 imaged by the second camera 4022 is displayed on the second image display 404b, the server 406 recognizes that the shooting image IM41 imaged by the first camera 4021 is displayed on the first image display 404a and the shooting image IM42 imaged by the second camera 4022 is displayed on the second image display 404b. In other words, the server 406 can recognize that the first user USa is watching the shooting image IM41 imaged by the first camera 4021, and can recognize that the second user USb is watching the shooting image IM42 imaged by the second camera 4022.

The first image adjustor 410a can recognize, from the server 406, the current position of the first camera 4021 imaging the shooting image IM41 and the second camera 4022 imaging the shooting image IM42, and that the second image adjustor 410b has acquired the shooting image IM42 imaged by the second camera 4022. The second image adjustor 410b can recognize, from the server 406, the current position of the first camera 4021 imaging the shooting image IM41 and the second camera 4022 imaging the shooting image IM42, and that the first image adjustor 410a has acquired the shooting image IM41 imaged by the first camera 4021.

The shooting image IM41 (IM42) acquired by the first image adjustor 410a is input to the image processor 411a. The image processor 411a analyzes the shooting image IM41 (IM42) to recognize the horizontal direction of the shooting image IM41 (IM42). The image processor 411a may analyze the shooting image IM41 (IM42) to recognize the vertical direction of the shooting image 1141 (IM42), or to recognize the horizontal direction and the vertical direction of the shooting image IM41 (IM42).

The first image adjustor 410a corrects distortion of the shooting image IM41 (IM42), executes image processing such as adjustment of the horizontal position of the shooting image IM41 (IM42), and outputs the image-processed shooting image IM41 (IM42) to the first image display 404a.

The shooting image IM42 (IM41) acquired by the second image adjustor 410b is input to the image processor 411b. The image processor 411b analyzes the shooting image IM42 (IM41) to recognize the horizontal direction of the shooting image IM42 (IM41). The image processor 411b may analyze the shooting image IM42 (IM41) to recognize the vertical direction of the shooting image IM42 (IM41), or to recognize the horizontal direction and the vertical direction of the shooting image IM42 (IM41).

The second image adjustor 410b corrects distortion of the shooting image IM42 (IM41), executes image processing such as adjustment of the horizontal position of the shooting image IM42 (IM41), and outputs the image-processed shooting image IM42 (IM41) to the second image display 404b.

The server 406 may correct distortion of the shooting image IM41 imaged by the first camera 4021 and the shooting image IM42 imaged by the second camera 4022, executes image processing such as adjusting the horizontal position of the shooting image IM41 imaged by the first camera 4021 and the shooting image IM42 imaged by the second camera 4022, and output the processed shooting image IM41 and shooting image IM42 to the first image adjustor 410a or to the second image adjustor 410b.

The first image display 404a displays the shooting image IM41 (IM42) subjected to image processing by the first image adjustor 410a or the server 406. By mounting the first image display 404a on the head of the first user USa, the first user USa can watch the shooting image IM41 (IM42) subjected to image processing by the first image adjustor 410a or the server 406.

The second image display 404b displays a shooting image IM42 (IM41) subjected to image processing by the second image adjustor 410b or the server 406. By mounting the second image display 404b on the head of the second user USb, the second user USb can watch the shooting image IM42 (IM41) subjected to image processing by the second image adjustor 410b or the server 406.

While the image display 404a (404b) is mounted on the head of the user USa (USb), the image display 404a (404b) generates attitude information PN4a (PN4b) based on the direction in which the user USa (USb) faces and the attitude or the like of the user USa (USb). The image processor 411a (411b) acquires the attitude information PN4a (PN4b) from the image display 404a (404b). That is, the image processor 411a (411b) acquires the attitude information PN4a (PN4b) based on the attitude of the image display 404a (04b).

Based on the attitude information PN4a, the image processor 411a of the first image adjustor 410a displays, on the first image display 404a, an image of a region corresponding to a direction in which the first user USa faces and a state such as the attitude of the first user USa from the shooting image IM41 imaged by the first camera 4021 or the shooting image IM42 imaged by the second camera 4022. Based on the attitude information PN4b, the image processor 411b of the second image adjustor 410b displays, on the second image display 404b, an image of a region corresponding to a direction in which the second user USb faces and a state such as the attitude of the second user USb from the shooting image IM41 imaged by the first camera 4021 or the shooting image IM42 imaged by the second camera 4022.

The controller 405a (405b), while being attached to the hand of the user USa (USb), generates instruction information NN4a (NN4b) based on the state of the hand movement or attitude of the user USa (USb). The image processor 411a (411b) acquires the instruction information NN4a (NN4b) from the controller 405a (405b).

Based on the instruction information NN4a, the image processor 411a of the first image adjustor 410a can change or adjust the shooting image IM41 or the shooting image IM42 displayed on the first image display 404a. Based on the instruction information NN4b, the image processor 411b of the second image adjustor 410b can change or adjust the shooting image IM41 or the shooting image IM42 displayed on the second image display 404b.

The image generator 412a of the first image adjustor 410a generates a composite image CM4b which is a CG to be synthesized with the shooting image IM41 (IM42). The image generator 412b of the second image adjustor 410b generates a composite image CM4a which is a CG to be synthesized with the shooting image IM42 (IM41). The composite image CM4a (CM4b) is an image of a character such as an avatar. The composite image CM4a is the avatar of the first user USa, and the composite image CM4b is the avatar of the second user USb.

When the first user USa operates the first controller 405a, the image generator 412a of the first image adjustor 410a generates the composite image CM4b which is the avatar of the second user USb and stores it in a built-in memory or an external memory. When the second user USb operates the second controller 405b, the image generator 412b of the second image adjustor 410b generates the composite image CM4a which is the avatar of the first user USa and stores it in the built-in memory or the external memory.

The image processor 411a (411b) may acquire the composite image CM4b (CM4a) generated by the image generator 412a (412b), and output the composite image CM4b (CM4a) to the server 406 via the second communicator 413a (413b) and the network.

When the user USa (USb) operates the controller 405a (405b), the image generator 412a (412b) may generate the composite image CM4a (CM4b) that is the avatar of the user USa (USb). The image processor 411a (411b) may acquire the composite image CM4a (CM4b) generated by the image generator 412a (412b) and output it to the server 406 via the second communicator 413a (413b) and the network. That is, the first user USa may set the avatar of the second user USb or may set its own avatar. The second user USb may set the avatar of the first user USa or may set its own avatar.

The server 406 stores the composite image CM4a (CM4b) in a built-in memory or an external memory in association with the user USa (USb). The server 406 may automatically set the composite image CM4a (CM4b) in association with the user USa (USb) and store it in the built-in memory or the external memory. Based on the instruction information NN4a (NN4b), the image processor 411a (411b) can acquire the composite image CM4b (CM4a) from the image generator 412a (412b) or the server 406 and display it on the image display 404a (404b).

The image generator 412a (412b) generates a spherical image VSS4a (VSS4b) that is a virtual image formed of a spherical surface that is CG. The image generator 412a (412b) stores the spherical image VSS4a (VSS4b) in a built-in memory or an external memory. Based on the instruction information NN4a (NN4b), the image processor 411a (411b) acquires the spherical image VSS4a (VSS4b) generated by the image generator 412a (412b) and displays it on the image display 404a (404b).

The spherical image VSS4a (VSS4b) of the fourth embodiment corresponds to the spherical image VSS1 of the first embodiment. The user USa (USb) moves the hand on which the controller 405a (405b) is attached to a position corresponding to the spherical image VSS4a (VSS4b) displayed on the image display 404a (404b), and feels as if the hand of the user USa (USb) is in contact with the spherical image VSS4a (VSS4b).

The controller 405a (405b) may have an actuator disposed in a portion of the user USa (USb) in contact with the hand. Based on the instruction information NN4a (NN4b), the image processor 411a (411b) operates the actuator when it is determined that the hand of the user USa (USb) has moved to a position corresponding to the spherical image VSS4a (VSS4b). When the actuator applies pressure to the hand of the user USa (USb), the user USa (USb) can feel the sensation that the hand contacts the spherical image VSS4a (VSS4b).

In a state where the spherical image VSS4a is displayed on the first image display 404a, when the first user USa moves the hand on which the first controller 405a is attached in an arbitrary direction, the image processor 411a of the first image adjustor 410a performs image processing based on the instruction information NN4a so that the spherical image VSS4a and the shooting image IM41 or the shooting image IM42 displayed on the first image display 404a move in accordance with the moving direction, moving speed and position of the hand of the first user USa.

In a state where the spherical image VSS4b is displayed on the second image display 404b, when the second user USb moves the hand on which the second controller 405b is attached in an arbitrary direction, the image processor 411b of the second image adjustor 410b, based on the instruction information NN4b, performs image processing so that the spherical image VSS4b displayed on the second image display 404b and the shooting image IM41 or the shooting image IM42 move in accordance with the moving direction, moving speed and position of the hand of the second user USb.

The user USa (USb) can rotate the spherical image VSS4a (VSS4b) in an arbitrary direction to an arbitrary position at an arbitrary speed by moving the hand in an arbitrary direction to an arbitrary position at an arbitrary speed. That is, the user USa (USb) can rotate the spherical image VSS4a (VSS4b) by the hand movement. The image processor 411a (411b) moves the shooting image IM41 (IM42) in accordance with the rotation of the spherical image VSS4a (VSS4b).

The image processor 411a (411b) can determine to which position on the coordinate of the zenith ZE of the spherical image VSS4a (VSS4b) before the user USa (USb) rotates the spherical image VSS4a (VSS4b) has moved by the user USa (USb) rotating the spherical image VSS4a (VSS4b).

The image processor 411a (411b) calculates, based on the moving direction of the zenith ZE and the position of the moving destination on the coordinate of the spherical image VSS4a (VSS4b), the amount of change in the spherical image VSS4a (VSS4b) between the time before and after the user USa (USb) rotates the spherical image VSS4a (VSS4b) and the time after the user USa (USb) rotates the spherical image VSS4a (VSS4b). The change amount of the spherical image VSS4a (VSS4b) of the fourth embodiment corresponds to the change amount of the spherical image VSS1 of the first embodiment.

The image processor 411a (411b) stores the amount of change in the spherical image VSS4a (VSS4b) as the correction value CV4a (CV4b). The correction value CV4a (CV4b) of the fourth embodiment corresponds to the correction value CV1 of the first embodiment. The image processor 411a (411b) may store the coordinates on the spherical image VSS4a (VSS4b) of the zenith ZE after the user USa (USb) has rotated the spherical image VSS4a (VSS4b) as the correction value CV4a (CV4b).

The image processor 411a (411b) may store the correction value CV4a (CV4b) in a built-in memory or an external memory, or may output the correction value CV4a (CV4b) to the server 406 via the second communicator 413a (413b) and the network. The server 406 stores the correction value CV4a (CV4b) in the built-in memory or the external memory in association with the image display 404a (404b) or the user USa (USb).

The image adjustment system 401 can display the composite image CM4b, which is the avatar of the second user USb, on the first image display 404a mounted on the first user USa, by synthesizing it with the shooting image IM41 (IM42). The image adjustment system 401 can display the composite image CM4a, which is the avatar of the first user USa, on the second image display 404b mounted on the second user USb by synthesized it with the shooting image IM42 (IM41).

With reference to the flowcharts illustrated in FIGS. 15 and 16, an example of an image adjustment method according to the fourth embodiment will be described. More specifically, an example of a method of synthesizing the shooting image IM41 with the composite image CM4b will be described. The first image display 404a is mounted on the head of the first user USa, and the first controller 405a is attached on the hand of the first user USa. The second image display 404b is mounted on the head of the second user USb, and the second controller 405b is attached on the hand of the second user USb. The first image display 404a displays the shooting image IM41 imaged by the first camera 4021, and the second image display 404b displays the shooting image IM42 imaged by the second camera 4022.

Figure 15:
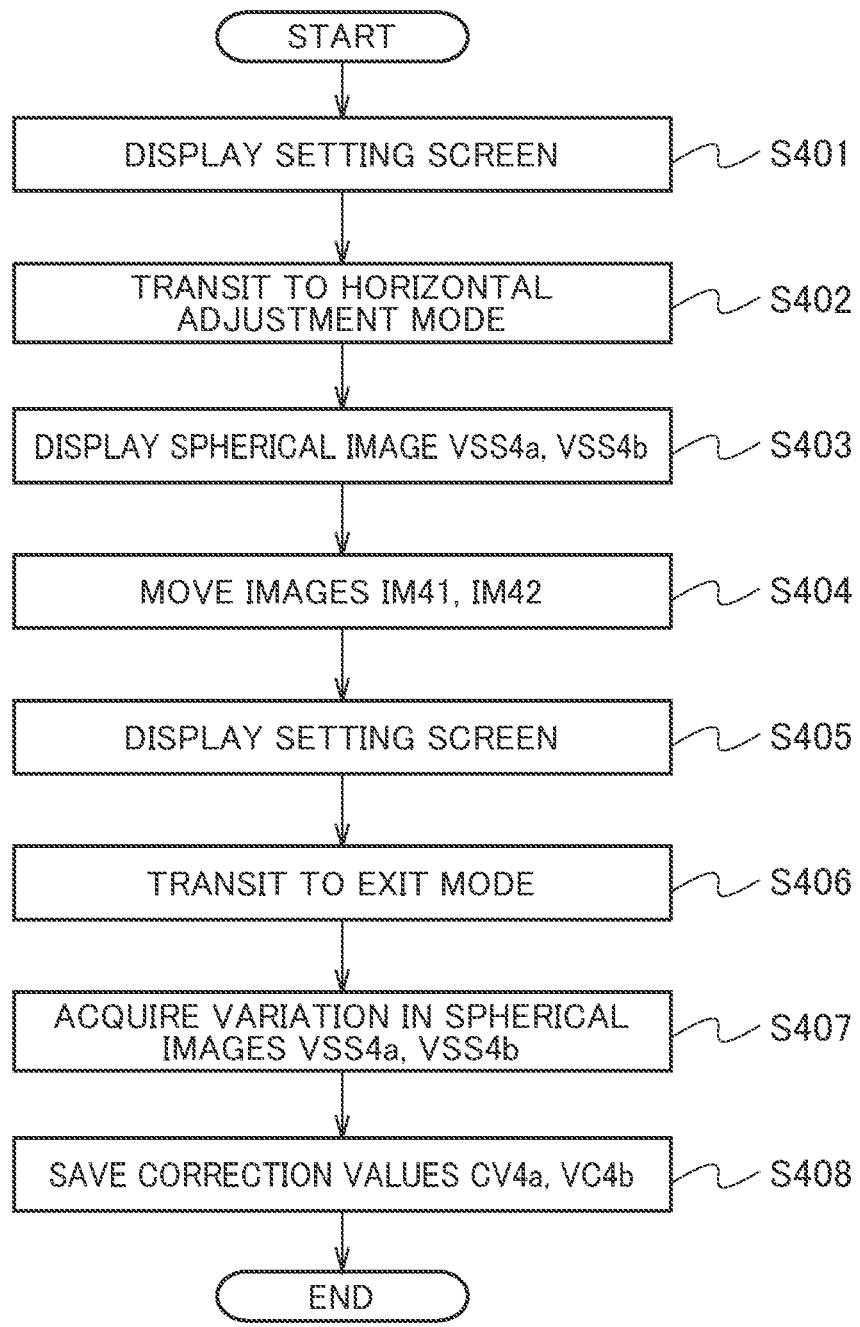
FIG. 15 is a flowchart illustrating an example of the image adjustment method according to the fourth embodiment.
Figure 16:
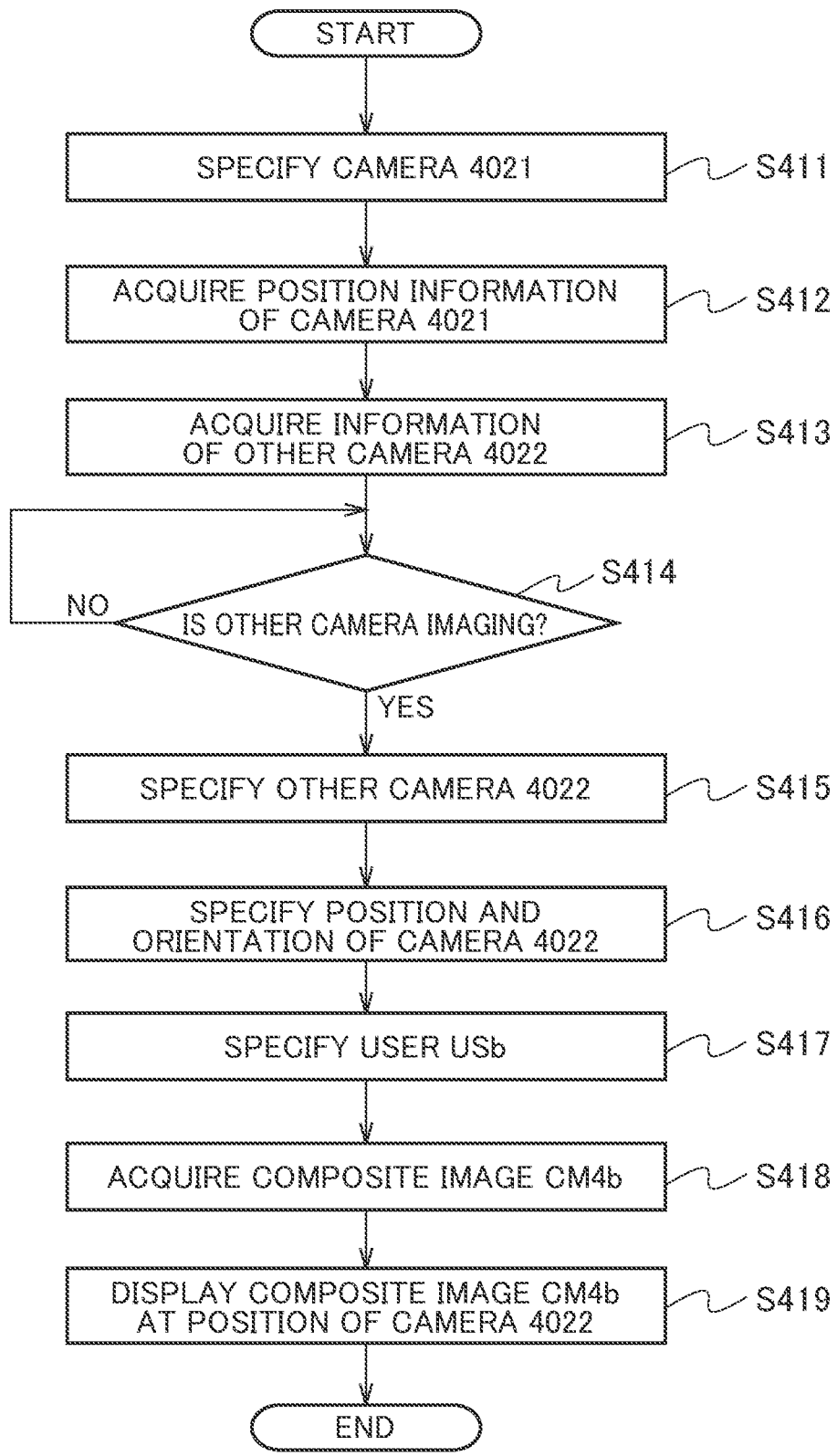
FIG. 16 is a flowchart illustrating an example of the image adjustment method according to the fourth embodiment.

If the user USa (USb) determines that the shooting image IM41 (IM42) displayed on the image display 404a (404b) is not horizontal, in FIG. 15, the user USa (USb) operates the controller 405a (405b), so that the image processor 411a (411b) causes the image display 404a (404b) to display a setting screen in step S401.

When the user USa (USb) operates the controller 405a (405b) to select a predetermined item (e.g. horizontal adjustment item) displayed on the setting screen, the image processor 411a (411b) shifts the processing to a predetermined processing mode corresponding to the selected item in step S402. When the horizontal adjustment item is selected, the image processor 411a (411b) shifts the processing to a processing mode for adjusting the horizontal of the shooting image IM41 (IM42) (horizontal adjustment mode).

In step S403, the image processor 411a (411b) acquires the spherical image VSS4a (VSS4b) generated by the image generator 412a (412b) and displays it on the image display 404a (404b). The image display 404a (404b) displays a mixture of the shooting image IM41 (IM42) and the spherical image VSS4a (VSS4b).

The user USa (USb) rotates the spherical image VSS4a (VSS4b) so that the shooting image IM41 (IM42) is horizontal, and the image processor 411a (411b) moves the shooting image IM41 (IM42) displayed on the image display 404a (404b) in step S404 in correspondence with the rotation of the spherical image VSS4a (VSS4b). The user USa (USb) may rotate the spherical image VSS4a (VSS4b) a plurality of times until the shooting image IM41 (IM42) becomes horizontal.

When the user USa (USb) determines that the shooting image IM41 (IM42) has become horizontal, the controller 405a (405b) is operated so that the image processor 411a (411b) terminates the display of the spherical image VSS4a (VSS4b) in step S405, and causes the image display 404a (404b) to display the setting screen. By leveling the shooting image IM41 (IM42) displayed on the image display 404a (404b), the zenith of the camera 4021 (4022) and that of the user USa (USb) can be matched.

When the user USa (USb) operates the controller 405*a* (405*b*) to select a predetermined item (e.g. end item) displayed on the setting screen, the image processor 411*a* (411*b*) shifts the processing to a predetermined processing mode corresponding to the selected item in step S406. When the item to be ended is selected, the image processor 411*a* (411*b*) shifts the processing to a processing mode (exit mode) for ending the horizontal adjustment.

In step S407, the image processor 411*a* (411*b*) acquires the amount of rotation before and after the rotation (rotation angle) of the spherical image VSS4*a* (VSS4*b*) as the amount of change of the spherical image VSS4*a* (VSS4*b*). In step S408, the image processor 411*a* (411*b*) stores the amount of change in the spherical image VSS4*a* (VSS4*b*) as the correction value CV4*a* (CV4*b*), and ends the process.

With reference to a flowchart illustrated in FIG. 16, a case will be described in which the composite image CM4*b*, which is the avatar of the second user USb, is displayed on the first image display 404*a* watched by the first user USa, while being synthesized with the shooting image IM41. In FIG. 16, in step S411, the image processor 411*a* identifies the first camera 41 that is imaging the obtained shooting image IM4021.

In step S412, the image processor 411*a* acquires, from the first camera 4021 or the server 406, the positional information of the first camera 4021. The position information of the first camera 4021 includes information on the current position of the first camera 4021 and the direction in which the first camera 4021 faces or moves.

In step S413, the image processor 411*a* acquires information on other cameras (cameras other than the first camera 4021) from the server 406. For example, in step S413, the image processor 411*a* acquires information on the second camera 4022 from the server 406. The information of the second camera 4022 includes the information of the second user USb watching the shooting image IM42 imaged by the second camera 4022, the present position of the second camera 4022, and the direction in which the second camera 4022 faces or moves. The direction in which the second camera 4022 faces or the direction in which the second camera moves corresponds to the direction in which the second user USb faces, and can be specified based on the shooting image IM42 displayed on the second image display 404*b*.

In step S414, the image processor 411*a* determines whether or not another camera (cameras other than the first camera 4021) is imaged in the shooting image IM41, that is, whether or not another camera is captured, for example, by image recognition. If it is determined in step S414 that no other camera is imaged in the shooting image IM41 (NO), the image processor 411*a* returns the process to step S414.

If it is determined in step S414 that another camera is imaged in the shooting image IM41 (YES), then in step S415, the image processor 411*a* identifies the other camera imaged in the shooting image IM41 based on the information of the other camera acquired in step S413.

Figure 17:
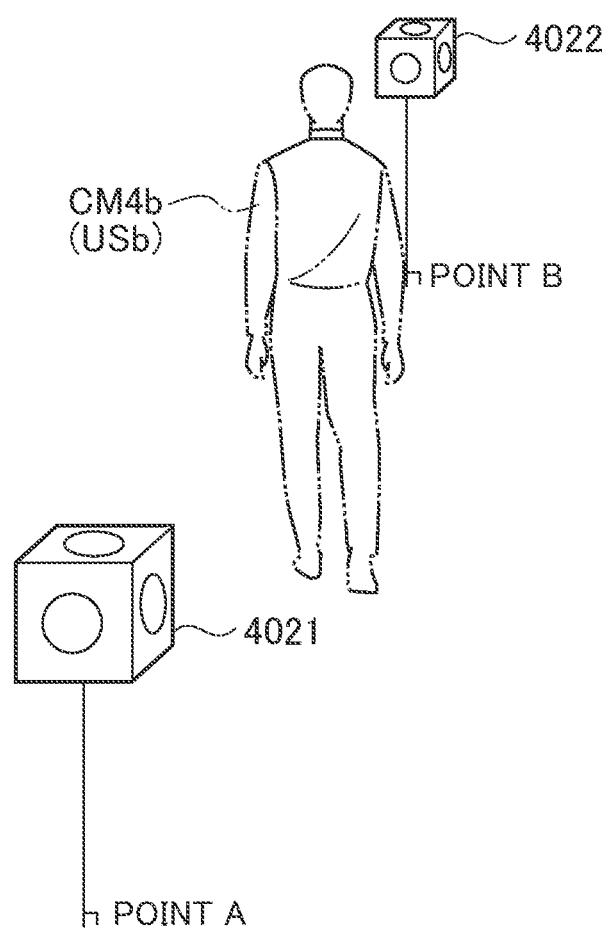
FIG. 17 is a diagram illustrating an example of a positional relationship between a plurality of cameras and a composite image corresponding to another user.

FIG. 17 illustrates a state in which the first camera 4021 is positioned at a point A and the second camera 4022 is positioned at a point B in front of the first camera 4021. In the state illustrated in FIG. 17, the shooting image IM41 of the first camera 4021 includes another camera, that is, the second camera 4022. The image processor 411*a* specifies, based on the information of the second camera 4022 acquired in step S413, that the camera imaged in the shooting image IM41 of the first camera 4021 is the second camera 4022.

In step S416, the image processor 411*a* specifies, based on the position information of the first camera 4021 acquired in step S412 and the information of the second camera 4022 acquired in step S413, the position of the second camera 4022 with respect to the first camera 4021 and the direction in which the second camera 4022 faces or moves.

In step S417, the image processor 411*a* identifies the user US who is watching the shooting image IM imaged by the camera identified in step S415. For example, the image processor 411*a* specifies the second user USb watching the shooting image IM42 imaged by the second camera 4022. In step S418, the image processor 411*a* acquires the composite image CM4*b*, which is the avatar of the second user USb. When the composite image CM4*b* is stored in the server 406, the image processor 411*a* acquires the composite image CM4*b* from the server 406.

In step S419, the image processor 411*a* synthesizes the composite image CM4*b* with the position of the shooting image IM41 corresponding to the second camera 4022, and displays the composite image CM4*b* on the first image display 404*a*. In steps S401 to S408, when the shooting image IM41 is horizontally adjusted, the image processor 411*a* horizontally adjusts the composite image CM4*b* in the same manner as the shooting image IM41 and displays it on the first image display 404*a*. When the correction value CV4*a* is stored, the image processor 411*a* horizontally adjusts the composite image CM4*b* based on the correction value CV4*a*, and displays the result on the first image display 404*a*.

The image processor 411*a* may change the size of the composite image CM4*b* in accordance with the position of the second camera 4021 with respect to the first camera 4022. For example, when the camera 4022 is located far away from the camera 4021, the image processor 411*a* performs image processing on the composite image CM4*b* so that the size of the composite image CM4*b* becomes smaller in accordance with the distance between the first camera 4021 and the second camera 4022, and synthesizes the composite image CM4*b* with the shooting image IM41.

The image processor 411*a* may change the direction of the composite image CM4*b* in accordance with the direction in which the second camera 4022 is facing or moving. The image processor 411*a* may acquire a composite image CM4*b* having a direction corresponding to the direction in which the second camera 4022 is directed or the direction in which it is moving.

In the image adjustment system 401, the image adjustor 410*a* (410*b*), and the image adjustment method according to the fourth embodiment, the image display 404*a* (404*b*) displays the spherical image VSS4*a* (VSS4*b*). With the image adjustment system 401, the image adjustor 410*a* (410*b*), and the image adjustment method according to the fourth embodiment, when the horizontal direction of the shooting image IM41 (IM42) is erroneously detected, or when the horizontal direction or the designation of the zenith ZE is deviated, the user USa (USb) can operate the controller 405*a* (405*b*) to rotate the spherical image VSS4*a* (VSS4*b*), thereby adjusting the shooting image IM41 (IM42) displayed on the image display 404*a* (404*b*) so as to be horizontal.

Therefore, with the image adjustment system 401, the image adjustor 410*a* (410*b*), and the image adjustment method according to the fourth embodiment, when the horizontal direction of the shooting image IM41 (IM42) is erroneously detected or the horizontal or zenith designation is shifted, the user US can easily correct the horizontal or zenith of the shooting image IM41 (IM42).

With the image adjustment system 401, the image adjustor 410a (410b), and the image adjustment method according to the fourth embodiment, when the correction value CV4a (CV4b) is stored, the image processor 411a (411b) reads the correction value CV4a (CV4b), adjusts the image of the shooting image IM41 (IM42) taken by the camera 4021 (4022) based on the correction value CV4a (CV4b), and displays the adjusted image on the image display 404a (404b).

In the image adjustment system 401, the image adjustor 410a (410b), and the image adjustment method according to the fourth embodiment, the position of the first camera 4021 relative to the second camera 4022 is specified, and the position of the second camera 4022 in the shooting image IM is synthesized with a composite image CM4b which is the avatar of the second user USb watching the shooting image IM4022 imaged by the second camera 42. Thus, the first user USa can obtain a sense of sharing the same space as the second user USb.

The present invention is not limited to the above-described embodiments, and various modifications can be made without departing from the gist of the present invention.

For example, the virtual image VSS generated by the CG may be an ellipsoidal surface (ellipsoid), and may be any closed surface (closed surface) within the reach of the user US. That is, it is only necessary to obtain a feeling that the user US comes into contact with the closed curved surface from the inside, so that the horizontal adjustment of the shooting image IM can be performed. Since the user US rotates the virtual image VSS, the virtual image VSS preferably has a spherical shape close to a spherical surface such as a spherical surface or an elliptical surface.

What is claimed is:

1. An image adjustment system, comprising:
    a camera;
    an image adjustor configured to adjust a shooting image imaged by the camera;
    an image display configured to display the shooting image adjusted by the image adjustor; and
    a controller configured to output instruction information to the image adjustor,
    wherein the image adjustor comprises:
        an image generator configured to generate a spherical image and a composite image to be synthesized with the shooting image, and
        an image processor configured to acquire the spherical image generated by the image generator based on the instruction information and display the spherical image on the image display, rotate the spherical image based on the instruction information, adjust the shooting image displayed on the image display in accordance with rotating the spherical image, adjust the composite image in accordance with the adjusted shooting image, and synthesize the adjusted composite image with the adjusted shooting image,
    wherein the camera is an omnidirectional camera configured to image a range of 360 degrees,
    wherein the image display is a head-mounted display capable of mounting on a head of a user,
    wherein the controller is a glove type controller capable of attaching on a hand of the user,
    wherein, when the user watches the spherical image displayed on the image display in a state where the image display is mounted on the head of the user, the spherical image is a virtual image arranged around the user and the image display and set to display within a range where the hand or a finger of the user is reached to the spherical image, and
    wherein, when the user moves the hand or finger of the user in an arbitrary direction while the controller is attached on the hand of the user, the image processor rotates the spherical image corresponding to the movement of the hand or finger of the user based on the instruction information, and adjusts the shooting image displayed on the image display corresponding to the rotation of the spherical image.

2. The image adjustment system of claim 1, wherein the image processor acquires a change in at least one rotation angle of the spherical image measured between before and after the spherical image is rotated, and adjusts the shooting image and the composite image based on the change in the at least one rotation angle.

3. The image adjustment system of claim 1, wherein the image processor adjusts horizontal positions of the shooting image and the composite image displayed on the image display in accordance with rotating the spherical image.

4. The image adjustment system of claim 1, wherein the image processor separates a horizontal plane of the shooting image from a horizontal plane of the composite image, further rotates the spherical image based on the instruction information, adjusts the shooting image displayed on the image display in accordance with the further rotation of the spherical image, adjusts the composite image in accordance with the adjusted shooting image, and synthesizes the adjusted composite image with the adjusted shooting image.

5. The image adjustment system of claim 4, wherein the image processor acquires a change in at least one rotation angle of the spherical image measured between before and after the spherical image is further rotated, and adjusts the shooting image based on the change in the at least one rotation angle.

6. The image adjustment system of claim 5, wherein the image processor adjusts the composite image by matching the horizontal plane of the composite image with the horizontal plane of the shooting image based on the change in the at least one rotation angle.

7. The image adjustment system of claim 1, wherein:
the image adjustor includes a plurality of image adjustors each configured to adjust a shooting image imaged by the camera;
the image display includes a plurality of image displays each configured to display the shooting image adjusted by a corresponding image adjustor of the plurality of image adjustors corresponding to a plurality of users;
the controller includes a plurality of controllers each configured to output instruction information to a corresponding image display of the plurality of image displays corresponding to the plurality of users; and
the image adjustment system further comprises a server configured to specify a first user of the plurality of users or a first image display of the plurality of image displays.

8. The image adjustment system of claim 1, wherein:
the camera includes a plurality of cameras;
the image adjustor is configured to adjust a shooting image imaged by a first camera of the plurality of cameras; and
the image adjustor comprises the image processor configured to, when a second camera of the plurality of cameras is imaged in the shooting image, synthesize the adjusted composite image in accordance with position information of the first camera and position information of the second camera with the shooting image in accordance with the position information of the second camera.

9. An image adjustor, comprising:
an image generator configured to generate a spherical image and a composite image to be synthesized with a shooting image imaged by a camera and displayed on an image display; and
an image processor configured to acquire the spherical image generated by the image generator based on instruction information acquired from a controller and display the spherical image on the image display, rotate the spherical image based on the instruction information, adjust the shooting image displayed on the image display in accordance with rotating the spherical image, adjust the composite image in accordance with the adjusted shooting image, and synthesize the adjusted composite image with the adjusted shooting image,
wherein the image display is a head-mounted display capable of mounting on a head of a user,
wherein the controller is a glove type controller capable of attaching to a hand of the user, and
wherein, when the user moves the hand or finger of the user in an arbitrary direction while the controller is attached on the hand of the user, the image processor rotates the spherical image corresponding to the movement of the hand or finger of the user based on the instruction information, and adjusts the shooting image displayed on the image display corresponding to the rotation of the spherical image.

10. An image adjustment method, comprising:
acquiring instruction information from a controller by an image processor;
acquiring a spherical image by the image processor, the spherical image generated by an image generator based on the instruction information;
displaying the spherical image by an image display;
rotating the spherical image by the image processor based on the instruction information;
adjusting a shooting image imaged by a camera and displayed on the image display in accordance with rotating the spherical image by the image processor;
acquiring a composite image by the image processor, the composite image generated by the image generator and to be synthesized with the shooting image displayed on the image display; and
adjusting the composite image in accordance with the adjusted shooting image and synthesizing the adjusted composite image with the adjusted shooting image, by the image processor,
wherein the image display is a head-mounted display capable of mounting on a head of a user,
wherein the controller is a glove type controller capable of attaching to a hand of the user, and
wherein, when the user moves the hand or finger of the user in an arbitrary direction while the controller is attached on the hand of the user, the image processor rotates the spherical image corresponding to the movement of the hand or finger of the user based on the instruction information, and adjusts the shooting image displayed on the image display corresponding to the rotation of the spherical image.

* * * * *